(12) United States Patent
Cook

(10) Patent No.: US 7,474,742 B2
(45) Date of Patent: Jan. 6, 2009

(54) ENVIRONMENTALLY-CONTROLLED NETWORK INTERFACE DEVICE AND METHODS

(75) Inventor: Charles I. Cook, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 1050 days.

(21) Appl. No.: 10/857,259

(22) Filed: May 28, 2004

(65) Prior Publication Data

US 2005/0008131 A1   Jan. 13, 2005

Related U.S. Application Data

(63) Continuation of application No. 10/356,364, filed on Jan. 31, 2003, now Pat. No. 7,180,988.

(51) Int. Cl.
*H04M 11/00* (2006.01)
(52) U.S. Cl. ............. 379/93.05; 379/93.07; 379/413.02
(58) Field of Classification Search ... 379/93.05–93.07, 379/413.02–413.04, 399.01
See application file for complete search history.

(56) References Cited

U.S. PATENT DOCUMENTS

| | | | |
|---|---|---|---|
| 4,775,997 A | 10/1988 | West, Jr. et al. | |
| 4,989,230 A | 1/1991 | Gillig et al. | |
| 5,202,765 A | 4/1993 | Lineberry | |
| 5,526,403 A | 6/1996 | Tam | |
| 5,740,075 A | 4/1998 | Bigham et al. | |
| 5,754,643 A * | 5/1998 | Decker et al. | 379/413.02 |
| 5,771,465 A | 6/1998 | Bojeryd | |
| 5,784,683 A | 7/1998 | Sistanizadeh et al. | |
| 5,923,379 A | 7/1999 | Patterson | |
| 5,971,921 A | 10/1999 | Timbel | |
| 5,983,068 A | 11/1999 | Tomich et al. | |
| 6,209,025 B1 | 3/2001 | Bellamy | |
| 6,282,189 B1 | 8/2001 | Eames | |

(Continued)

OTHER PUBLICATIONS

Frank, Edward and Holloway, Jack; "Connecting the Home with a Phone Line Network Chip Set", IEEE Micro, Mar.-Apr. 2000, pp. 2-14.

(Continued)

*Primary Examiner*—Stella L Woo
(74) *Attorney, Agent, or Firm*—Townsend and Townsend and Crew, LLP

(57) ABSTRACT

Certain embodiments of the invention provide network interface devices, as well as systems and methods for using them. In accordance with some embodiments, a network interface device may provide a controlled environment for an interior space defined by the exterior of network interface device. The network interface device may further be configured to be exposed to an interior of a subscriber premises and/or to allow for thermal transfer between the interior of the subscriber premises and the interior of the network interface device. In particular embodiments, the network interface device may be configured to be disposed at least partially within an external wall of the subscriber premises. In some cases, a portion of the network interface device exposed to the exterior of the subscriber premises may be insulated and/or one or more openings may be provided in the portion of the network interface device exposed to the interior of the subscriber premises, which can allow air to circulate between the interior of the subscriber premises and the interior of the network interface device.

52 Claims, 24 Drawing Sheets

U.S. PATENT DOCUMENTS

| | | | |
|---|---|---|---|
| 6,299,526 B1 * | 10/2001 | Cowan et al. | 454/184 |
| 6,322,375 B1 * | 11/2001 | Cole et al. | 439/76.1 |
| 6,505,123 B1 | 1/2003 | Root et al. | |
| 6,990,192 B1 * | 1/2006 | Denovich et al. | 379/399.01 |
| 2003/0026416 A1 | 2/2003 | Fusco | |
| 2004/0150518 A1 | 8/2004 | Phillips et al. | |
| 2004/0150748 A1 | 8/2004 | Phillips et al. | |
| 2004/0150749 A1 | 8/2004 | Phillips et al. | |
| 2004/0150750 A1 | 8/2004 | Phillips et al. | |
| 2004/0150751 A1 | 8/2004 | Phillips et al. | |
| 2004/0151161 A1 | 8/2004 | Casey et al. | |
| 2004/0151168 A1 | 8/2004 | Phillips et al. | |
| 2004/0151289 A1 | 8/2004 | Phillips et al. | |
| 2004/0151290 A1 | 8/2004 | Magarasevic et al. | |
| 2004/0152493 A1 | 8/2004 | Phillips et al. | |
| 2004/0153289 A1 | 8/2004 | Casey et al. | |
| 2004/0153577 A1 | 8/2004 | Phillips et al. | |
| 2004/0153670 A1 | 8/2004 | Casey et al. | |
| 2004/0160460 A1 | 8/2004 | Casey et al. | |
| 2004/0163125 A1 | 8/2004 | Phillips et al. | |
| 2004/0163126 A1 | 8/2004 | Phillips et al. | |
| 2004/0163128 A1 | 8/2004 | Phillips et al. | |
| 2004/0168199 A1 | 8/2004 | Phillips et al. | |
| 2004/0172657 A1 | 9/2004 | Phillips et al. | |
| 2004/0176085 A1 | 9/2004 | Phillips et al. | |
| 2004/0177163 A1 | 9/2004 | Casey et al. | |
| 2004/0264687 A1 | 12/2004 | Casey et al. | |
| 2005/0018653 A1 | 1/2005 | Phillips et al. | |
| 2005/0022007 A1 | 1/2005 | Phillips et al. | |

OTHER PUBLICATIONS

Nextnet Expedience: NLOS Plug-and-Play Portable Customer Premise Equipment Integrated Radio Modem, Non Line-of-Sight Broadband Wireless Residential Subscriber Unit (RSU-2510A), NextNet Wireless, Inc., 2003.

* cited by examiner

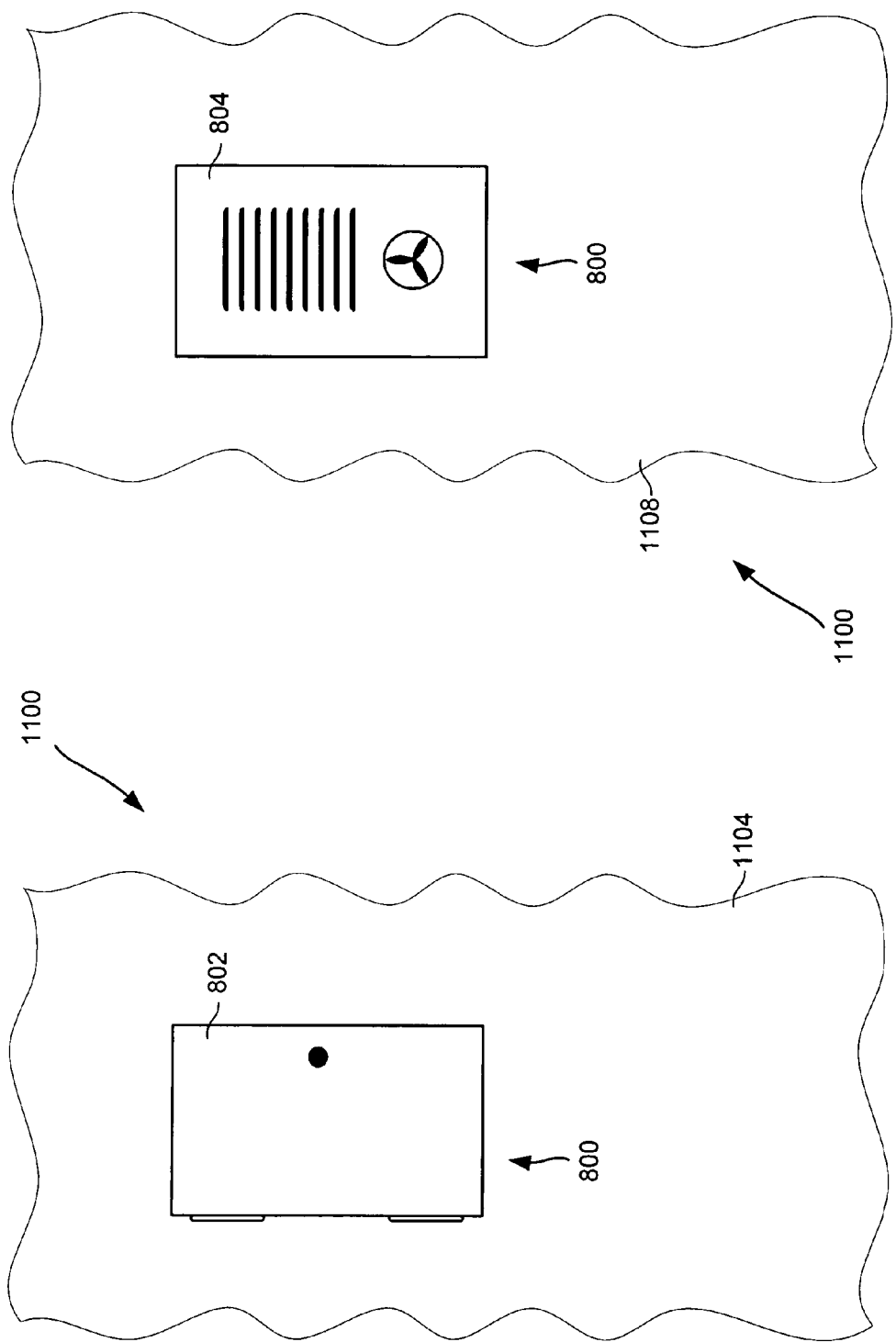

ENVIRONMENTALLY-CONTROLLED NETWORK INTERFACE DEVICE AND METHODS

CROSS-REFERENCES TO RELATED APPLICATIONS

This application is a continuation-in-part of U.S. application Ser. No. 10/356,364, filed Jan. 31, 2003 by Phillips et al. and entitled "Packet Network Interface Device and Systems and Methods for Its Use" (the "364 Application"), the entire disclosure of which is hereby incorporated by reference for all purposes.

BACKGROUND

The present invention relates to the provision of telecommunication services.

Those skilled in the art will recognize that telecommunication service providers often employ a network interface device or other demarcation device at a subscriber premises. The network interface device generally is designed to serve as an interface between the customer's premise wiring (or other local communications media) and the provider's network. In the past, network interface devices have been fairly unsophisticated, merely providing a hard-wired connection between the premise wiring and the provider network, and have generally been located at the exterior of the subscriber premises, in order to allow the provider's technicians or contractors to access the device for maintenance, upgrade and/or troubleshooting purposes.

Recently, however, telecommunication services have become more sophisticated, and the provision of such services has led to the use of more sophisticated components within a network interface device, and indeed, more sophisticated network interface devices themselves. Examples of such devices (and their components) are described in detail in the following U.S. patent applications, the entire disclosures of which are hereby incorporated by reference for all purposes: the '364 Application (already incorporated by reference); U.S. application Ser. No. 10/676,418 filed Sep. 30, 2003 by Phillips et al. and entitled "METHODS, SYSTEMS AND APPARATUS FOR PROVIDING URGENT PUBLIC INFORMATION"; U.S. application Ser. No. 10/377,282, filed Feb. 27, 2003 by Casey et al. and entitled "SYSTEMS AND METHODS FOR DISPLAYING DATA OVER VIDEO"; U.S. application Ser. No. 10/356,688, filed Jan. 31, 2003 by Phillips et al. and entitled "SYSTEMS, METHODS AND APPARATUS FOR PROVIDING A PLURALITY OF TELECOMMUNICATIONS SERVICES"; U.S. application Ser. No. 10/356,338, filed Jan. 31, 2003 by Phillips et al. and entitled "CONFIGURABLE NETWORK INTERFACE DEVICE AND SYSTEMS AND METHODS FOR ITS USE"; U.S. application Ser. No. 10/367,596, filed Feb. 14, 2003 by Casey et al. and entitled "SYSTEMS AND METHODS FOR DELIVERING A DATA STREAM TO A VIDEO APPLIANCE"; U.S. application Ser. No. 10/367,597, filed Feb. 14, 2003 by Casey et al. and entitled "SYSTEMS AND METHODS FOR PROVIDING APPLICATION SERVICES"; U.S. application Ser. No. 10/377,290, filed Feb. 27, 2003 by Phillips et al. and entitled "SYSTEMS AND METHODS FOR FORMING PICTURE-IN-PICTURE SIGNALS"; U.S. application Ser. No. 10/377,283 filed Feb. 27, 2003 by Phillips et al. and entitled "SYSTEMS AND METHODS FOR MONITORING VISUAL INFORMATION"; U.S. application Ser. No. 10/377,584 filed Feb. 27, 2003 by Phillips et al. and entitled "SYSTEMS AND METHODS FOR DELIVERING PICTURE-IN-PICTURE SIGNALS AT DIVERSE COMPRESSIONS AND BANDWIDTHS"; U.S. application Ser. No. 10/377,281 filed Feb. 27, 2003 by Phillips et al. and entitled "SYSTEMS AND METHODS FOR PROVIDING AND DISPLAYING PICTURE-IN-PICTURE SIGNALS"; U.S. application Ser. No. 10/444,941, filed May 22, 2003 by Phillips et al. and entitled "SYSTEMS AND METHODS FOR PROVIDING TELEVISION SIGNALS USING A NETWORK INTERFACE DEVICE"; U.S. application Ser. No. 10/448,249, filed May 22, 2003 by Phillips et al. and entitled "METHODS AND APPARATUS FOR DELIVERING A COMPUTER DATA STREAM TO A VIDEO APPLIANCE WITH A NETWORK INTERFACE DEVICE"; U.S. application Ser. No. 10/624,454, filed Jul. 21, 2003 by Casey et al. and entitled "SYSTEMS AND METHODS FOR INTEGRATING MICROSERVERS WITH A NETWORK INTERFACE DEVICE"; and U.S. application Ser. No. 10/676,429, filed Sep. 30, 2003 by Phillips et al. and entitled "METHODS, SYSTEMS AND APPARATUS FOR SELECTIVELY DISTRIBUTING URGENT PUBLIC INFORMATION"; U.S. application Ser. No. 01/715,879, filed Nov. 17, 2003 by Phillips et al. and entitled "FIBER OPTIC INTERNET PROTOCOL NETWORK INTERFACE DEVICE AND METHODS AND SYSTEMS FOR USING THE SAME"; U.S. application Ser. No. 10/854,738, filed May 25, 2004 by Casey et al. and entitled "ALERT GATEWAY AND METHODS" ; and U.S. application Ser. No. 10/854,774, filed May 25, 2004 by Casey et al. and entitled "METHODS AND SYSTEMS FOR PROVIDING DATA TRANSMISSION OVER MULTIPLE MEDIA" (attorney docket no. 020366-090400US).

As disclosed in the above applications, for example, these sophisticated network interface devices often comprise components that operate optimally under controlled environmental conditions. Merely by way of example, a network interface device designed to provide communication with a provider's fiber network often will have an opto-electrical converter that requires electrical current to function. This electrical current may be provided by the provider's network and/or by an electrical source at the subscriber's location (such as a connection to the subscriber's household A/C supply, etc.). Those skilled in the art will appreciate, however that, even in the presence of such electrical supply, it may be necessary to include a backup electricity source (such as a battery, capacitor, etc.) to provide backup electrical supply in the case of electrical failure, for instance to provide "life-line" telephone service to the subscriber premises. Such backup electricity sources often function optimally under controlled environmental conditions (relatively constant temperature, humidity, etc.). For example, common batteries generally will provide relatively lower output under relatively low temperatures. Conversely, relatively high temperatures adversely affect the operational life of such batteries. Likewise, other electrical and/or optical components can suffer degradation of performance and/or reliability when exposed to uncontrolled environmental conditions typical of an exterior location.

One solution would be to place a network interface device comprising such components inside a subscriber premises, to take advantage of the controlled environmental conditions of the premises interior. This solution, however, prevents access to the provider's personnel to perform troubleshooting, maintenance and/or upgrades, in the event a subscriber is absent or refuses admission to the provider's personnel. Thus, there is a need for an environmentally-controlled network interface device that still provides relatively unfettered access to a provider's personnel.

BRIEF SUMMARY

Certain embodiments of the invention provide network interface devices, as well as systems and methods for using them. In accordance with some embodiments, a network interface device may provide a controlled environment for an interior space defined by the exterior of network interface device. The network interface device may further be configured to be exposed to an interior of a subscriber premises and/or to allow for thermal transfer between the interior of the subscriber premises and the interior of the network interface device. In particular embodiments, the network interface device may be configured to be disposed at least partially within an external wall of the subscriber premises. In some cases, a portion of the network interface device exposed to the exterior of the subscriber premises may be insulated and/or one or more openings may be provided in the portion of the network interface device exposed to the interior of the subscriber premises, which can allow air to circulate between the interior of the subscriber premises and the interior of the network interface device.

Merely by way of example, one set of embodiments provides network interface devices. An exemplary network interface device, which may be used in a relationship between a telecommunication service provider and a subscriber, may comprise a first face configured to be at least partially exposed to an exterior of a customer premises and/or a second face generally opposing the first face and configured to be at least partially exposed to an interior of a customer premises. The first face may comprise a security device configured to prevent unauthorized access to the network interface device from the exterior of the customer premises and/or may be further configured to protect an interior of the network interface device from ambient environmental conditions external to the customer premises. The second face may be further configured to allow ambient environmental conditions internal to the customer premises to influence an interior space of the network interface device, which may be defined by the first and second faces and/or may be configured to have disposed therein at least one telecommunication component. The interior space defined by the first and second faces may have generally stable environmental conditions.

In some embodiments, the network interface device may further comprise at least one telecommunication component disposed within the space defined by the first and second faces, and/or the at least one telecommunication component may be configured to provide connectivity between an internal communication medium and an external communication medium. In yet further embodiments, the network interface device may comprise a backup supply of electrical power (e.g., one or more batteries, each of which may be accessed via the first and/or second faces of the network interface device) disposed within the interior space defined by the first and second faces and in electrical communication with the at least one telecommunication component. The backup supply of electrical power may also be configured to provide operational power to the at least one telecommunication component in the event of a general electrical power failure affecting the subscriber premises. In accordance with other embodiments, a network interface device may comprise at least one attachment member disposed within the interior space defined by the first and second faces. The at least one attachment member may be configured to be coupled with at least one telecommunication component.

In accordance with other embodiments, a network interface device may be designed to be located at a subscriber premises and/or may be configured to provide a stable operating environment for telecommunication components. In some cases, the network interface device may be configured to be disposed at least partially within an external wall of the subscriber premises and/or to be disposed between two structural members of an external wall of the subscriber premises. The network interface device can comprise a first face and a second face generally opposing the first face, and the first and second faces may define an interior space therebetween sufficient to house at least one telecommunication component. The first face may be configured to be at least partially exposed to an exterior of a customer premises, such that at least a portion of the first face may be accessed by a technician of the telecommunication service provider at a location exterior to the customer premises without requiring access to an interior of the subscriber premises. The second face may be configured to be at least partially exposed to the interior of the customer premises, such that the exposure of at least a portion of the second face to the interior of the customer premises allows ambient environmental conditions of the interior of the customer premises to affect the environmental conditions of the space defined by the first face and the second face.

The second face may define at least one opening configured to allow the exchange of airflow between the interior of the subscriber premises and the interior space defined by the first and second faces and/or may be configured to encourage thermal transfer between the interior of the subscriber premises and the interior space defined by the first and second faces. Merely by way of example, the second face may comprise a relatively thermally-conductive material and/or may comprise one or more baffles configured to provide a relatively large surface area across which thermal transfer may occur. Alternatively and/or in addition, the network interface device may further comprise a circulation device configured to facilitate the exchange of airflow between the interior of the subscriber premises and the interior space defined by the first and second faces. The first face may comprise an insulating material, which might be configured to inhibit thermal conductivity between environmental conditions outside the customer premises and the interior space defined by the first and second faces.

In some embodiments, the network interface device can further define at least one opening through which at least one external communication medium and/or at least one external communication medium may be disposed, allowing the at least one internal communication medium and/or the at least one external communication medium to be terminated within the network interface device. In other embodiments, at least a portion of the second face may be configured as an access panel that can be opened to provide access from the interior of the subscriber premises to at least a portion of the interior space defined by the first and second faces. The network interface device may further comprise means to prevent the access panel from being opened except from the interior of the subscriber premises.

Another set of embodiments provides structures, including without limitation, subscriber premises, that incorporate a network interface device. One exemplary structure is a subscriber premises that comprises at least one external wall and a network interface device at least partially disposed within the at least one external wall. In some embodiments, the at least one external wall may comprise a first structural member and a second structural member, and/or the network interface device may be disposed between the first structural member and the second structural member.

The network interface device may be similar to those described above and/or may comprise a first face configured to be at least partially exposed to an exterior of a customer premises and/or a second face generally opposing the first face and configured to be at least partially exposed to an interior of the customer premises. The first face may comprise a security device configured to prevent unauthorized access to the network interface device from the exterior of the customer premises, and/or the first face may be configured to protect an interior of the network interface device from ambient environmental conditions external to the customer premises. The second face may be configured to allow ambient environmental conditions internal to the customer premises to influence an interior space of the network interface device. The network interface device may further comprise an interior space defined by the first and second faces; the interior space may be configured to have disposed therein at least one telecommunication component, the interior space defined by the first and second faces further having generally stable environmental conditions.

A further set of embodiments comprises systems that may be used to provide telecommunication services to a subscriber. An exemplary system comprises an external communication medium in communication with a telecommunication network and a network interface device in communication with the external communication medium. The network interface device can be similar to those described above and/or may be configured to provide communication between the external communication network and an internal communication local to a premises of the subscriber. In accordance with some embodiments, the network interface may comprise a first face configured to be at least partially exposed to an exterior of a customer premises and/or a second face generally opposing the first face and configured to be at least partially exposed to an interior of a customer premises. The first face may (but need not) comprise a security device configured to prevent unauthorized access to the network interface device from the exterior of the customer premises, and/or the second face may comprise a security device configured to prevent unauthorized access to the interior of the subscriber premises from the interior space of the network interface device.

In some cases, the first face may be configured to protect an interior of the network interface device from ambient environmental conditions external to the customer premises, and/or the second face may be further configured to allow ambient environmental conditions internal to the customer premises to influence an interior space of the network interface device. The network interface device may, in particular embodiments, comprise an interior space defined by the first and second faces; the interior space may be configured to have disposed therein at least one telecommunication component and/or may have generally stable environmental conditions.

Yet another set of embodiments provides methods of implementing and/or providing network interface devices, including without limitation those network interface devices described above and elsewhere herein. Any exemplary method may comprise a method of providing telecommunication services to the subscriber. The method may comprise providing, at the subscriber premises, a network interface device (which, as noted previously, may be similar in structure and/or configuration to those described above) and/or disposing the network interface device so that the first face of the network interface device is at least partially exposed to an exterior of the customer premises and/or the second face of the network interface device is at least partially exposed to an interior of the customer premises. The interior space of the network interface device may be maintained at relatively constant environmental conditions.

In some embodiments, disposing the network interface device so that the first face of the network interface device is at least partially exposed to an exterior of the customer premises and the second face of the network interface device is at least partially exposed to an interior of the customer premises can comprise disposing the network interface at least partially within an external wall of the subscriber premises. In other embodiments, disposing the network interface device so that the first face is at least partially exposed to an exterior of the customer premises and the second face is at least partially exposed to an interior of the customer premises can comprise disposing the network interface between two structural members of an exterior wall of the subscriber premises. The first face may be insulated to inhibit thermal transfer from the exterior of the subscriber premises to the interior space defined by the first and second faces of the network interface device, and/or at least one opening may be provided in the second face of the network interface device; the at least one opening can be configured to allow the exchange of airflow between the interior of the subscriber premises and the interior space defined by the first and second faces. Alternatively and/or in addition, the second face can be configured to encourage thermal transfer between the interior of the subscriber premises and the interior space defined by the first and second faces.

The method, in some cases, may further comprise terminating an external communication medium within the interior space defined by the first and second faces, terminating an internal communication medium within the interior space defined by the first and second faces, and/or providing with at least one telecommunication component communications between the external communication medium and the internal communication medium. In other cases, the method may comprise accessing the interior space of the network interface device from a location external to the subscriber premises (e.g., via the first face of the network interface device and/or from the interior of the subscriber premises (e.g., via the second face of the network interface device). In further cases, the second face of the network interface device may be secured, such that the interior space of the network interface device may be accessed from the interior of the subscriber premises via the second face of the network interface device but the second face of the network interface device may not be opened from the interior of the network interface device; in this way, unauthorized access to the interior of the subscriber premises from the interior of the network interface device may be prevented.

In certain embodiments, the network interface device may comprise at least one attachment member disposed within the interior space defined by the first and second faces; the at least one attachment member may be configured to be coupled with at least one telecommunication component. The method, then, may further comprise coupling a telecommunication component with the at least one attachment member, so that the telecommunication component is disposed within the interior space defined by the first and second faces. Optionally, one or more external and/or internal communication media may be terminated within the interior space of the network interface device, and/or communication may be provided between the external communication medium and the internal communication medium (e.g., with the at least one telecommunication component).

Other embodiments provide methods for providing subscriber premises. One exemplary method can comprise constructing a subscriber premises comprising at least one external wall and disposing at least partially within the at least one external wall a network interface device, which can be similar to the network interface devices described above and/or elsewhere herein. In some cases, constructing a subscriber premises comprising at least one external wall can comprise incorporating within the at least one external wall a first structural member and a second structural member. In other cases, disposing at least partially within the at least one external wall a network interface device may comprise disposing the network interface device between the first structural member and the second structural member.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a capital letter to denote one of multiple similar components. When reference is made to a reference numeral without specification of a sub-label, the reference is intended to refer to all such multiple similar components.

DETAILED DESCRIPTION OF THE INVENTION

Figure 1A:
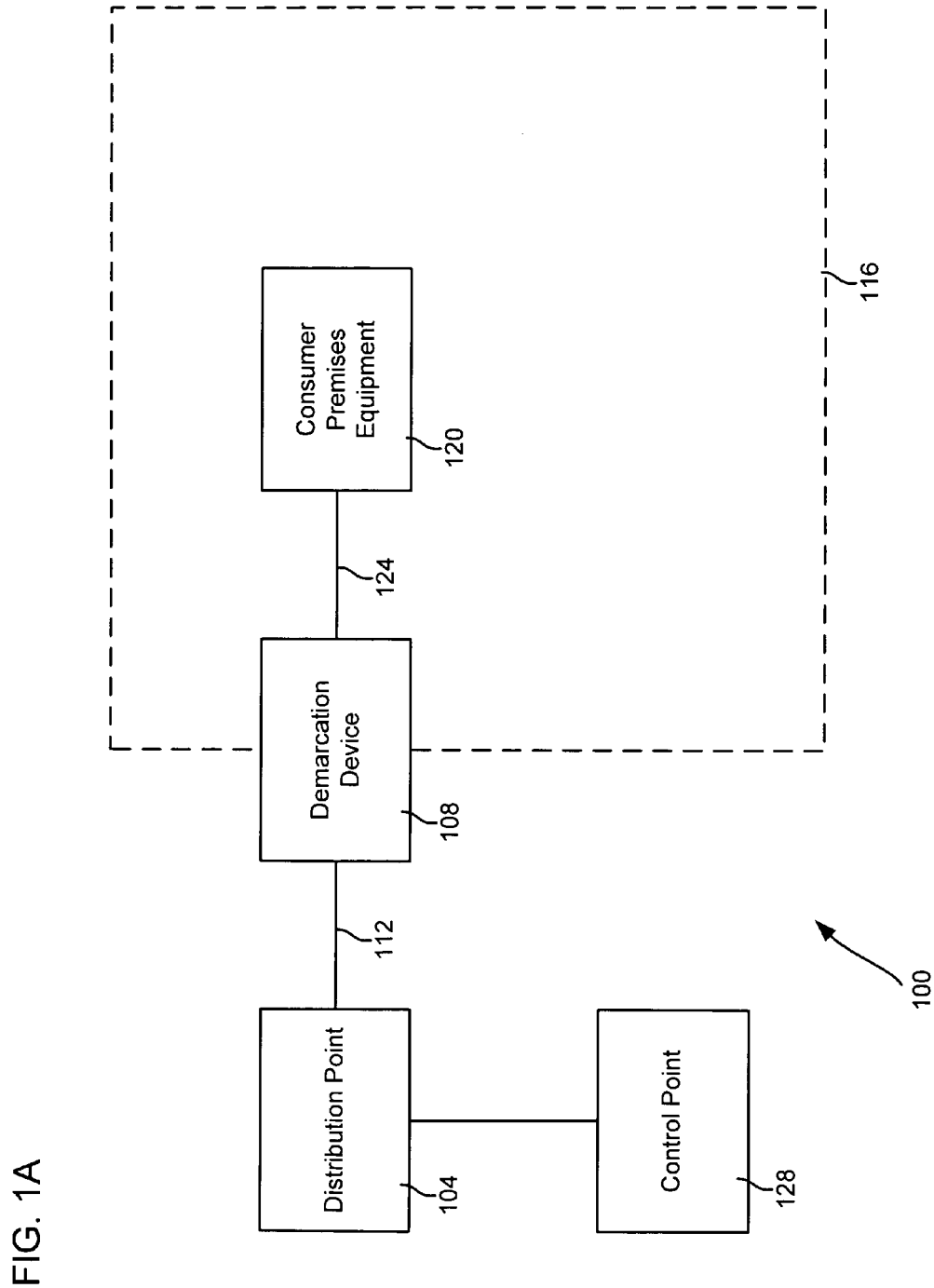
FIGS. 1A-1G illustrate systems for using demarcation devices according to certain embodiments of the invention.

Certain embodiments of the present invention are directed to demarcation devices that can be used to provide telecommunication services, as well as to methods and systems of using such devices. A demarcation device can be any device capable of serving as an interface between a customer premises and a telecommunication service provider's network. Such devices can include, merely by way of example, set top boxes (which can be used, inter alia, as an interface between a customer's video appliance and a provider's video network), broadband modems (including xDSL modems, cable modems and wireless modems, each of which can be used to provide video and/or data to a customer premises), integrated access devices (which can, for instance, translate between Voice over IP ("VoIP") signals and traditional telephone signals, thus allowing traditional telephones to connect to a VoIP network), devices compatible with the session initiation protocol ("SIP") familiar to those skilled in the art, and/or the like. One particular demarcation device is a network interface device ("NID"), described in detail below. In certain aspects, demarcation devices can be used to separate received telecommunication information into discrete sets, and optionally to process certain of those sets independently from other sets and/or transmit different sets to different locations, perhaps through the use of different interfaces.

As used herein, references to the term "telecommunication information" should be interpreted to include any information that can be transmitted or carried by a telecommunication service provider's network (e.g., the Public Switched Telephone Network or "PSTN") or by any other telecommunication network, including but not limited to the Internet. Such information includes, for example, voice signals (e.g., Plain Old Telephone Service or "POTS," as the term is known to those skilled in the art), audio and video signals (encoded in any standard and/or proprietary, digital and/or analog format now known or hereafter developed, using any of a variety of means known to those skilled in the art, such as HDTV, NTSC and PAL formatting, as well as, for example, any of the MPEG digital encoding and/or compression algorithms), and data. Such data can be formatted according any of a variety of protocols familiar in the art, including in particular any of the protocols known in the art as part of the TCP/IP suite, in particular the Internet Protocol ("IP"). Data can also include infrastructural protocols, including, for instance, routing protocols and protocols necessary to implement advanced networking schemes known to those skilled in the art, such as multi-protocol label switching ("MPLS"), Ethernet in the first mile ("EFM"), Voice Over IP ("VOIP") and/or Video over IP ("VideoIP"), to name but a few.

In this document, the term "telecommunication service provider" can mean any entity that provides telecommunication service to a customer's premises, including, merely by way of example, incumbent local exchange carriers, competitive local exchange carriers, cable television carriers, and satellite providers, to name a few. In contrast, the term "telecommunication information provider," means any entity that is capable of serving as a source of telecommunication information. In many cases, a particular entity may be considered both a telecommunication service provider and a telecommunication information provider, for instance, when a local exchange carrier provides Internet service to a customer, as well as the external transport medium attached to that customer's premises. In other cases, the two may be separate entities. For instance, according to certain embodiments of the invention, a cable television provider could contract with a local exchange carrier to provide broadcast television signals to a customer premises using the local exchange carrier's network and/or an external transport medium operated by the local exchange carrier.

The term "telecommunication information set" is used to describe a discrete subset of the telecommunication information transmitted across a particular transport medium and/or received by a demarcation device. Generally, the telecommunication information that is classified part of a particular information set shares a common characteristic. Merely by way of example, an information set can comprise telecommunication information of a particular type (e.g., voice, IP data, encoded video, and such), information associated with a particular application (e.g., information assigned to a specific IP port, as is known in the art, or information used by a particular software and/or hardware program), information addressed to or received from a particular device or network segment, information received within a particular reception window, and the like.

In certain embodiments, demarcation devices can support the one-way flow of telecommunication information, as for example, in the case of a simple set top box, which can receive data representing a video signal, decode that data, and transmit a video signal to an attached television. In other embodiments, however, demarcation devices can support bidirectional flow of telecommunication information. For example, an xDSL modem allows the transmission of data both to and from a customer premises. In still other embodiments, a demarcation device can be configured to support both unidirectional and bidirectional information flows simultaneously, depending on the type of telecommunication information transmitted or the source of the information.

In one important aspect, demarcation devices can function to isolate the telecommunication service provider's network from the network at the customer premises. As described in detail below, the service provider's network can be thought of as an "external transport medium," while the customer's network can be termed an "internal transport medium." Both external transport media and internal transport media are types of "transport media," a term used in this document to describe any cable, wire or other medium capable of carrying telecommunication information, including, but not limited to, twisted pair copper wiring (shielded or unshielded, including, for example, unshielded cables complying with industry-standard categories 3, 5, 5e and 6 and shielded cables commonly known as Token Ring™ cables, to name a few), optical fiber (including without limitation both single-mode and multimode fiber, as well as doped fiber, wavelength-division multiplexed, coarse wavelength-division multiplexed, wide wavelength-division multiplexed, dense wavelength-division and ultra-dense wavelength-division multiplexed fiber) and coaxial cable.

Other examples of transport media can also include universal serial bus ("USB") cable, cable complying with the Institute of Electrical and Electronics Engineers' ("IEEE") 1394 standard, as well as any medium capable of complying with the many local area networking standards known in the art. Of course, a transport medium need not be a physical medium; it can also comprise any of a wide variety of wireless transmissions, including (but not limited to) infra-red transmissions, radio frequency ("RF") transmissions, and transmissions complying with standards developed by any of the IEEE's working groups governing wireless communication (e.g., the 802.11, 802.15, 802.16 and 802.20 working groups). Similarly, a transport medium can comprise other wireless technologies, such as point-to-point microwave, including local multipoint distribution system ("LMDS"), microwave multipoint distribution system and/or multipoint multi-channel distribution system (collectively, "MMDS") transmissions, and satellite, cellular/PCS, and/or ultra wideband transmissions, to name a few.

In certain embodiments, a demarcation device can act as an active demarcation point, serving to isolate the external transport medium from the internal transport medium (perhaps via an isolation device, discussed below), such that operational changes in one network do not affect the other network. "Operational changes" can include any changes in the structure, topology, format, protocol, bandwidth, media and/or other operational parameters of a network. This feature can provide many benefits; for instance, the demarcation device can serve as a disclosed interface between a customer premises and a provider's network, allowing the provider to implement changes in its network without disrupting the service provided to the customer.

Likewise, the isolation of the internal transport medium from the external transport medium can allow for any variety of customer premise equipment ("CPE") (which can be any device that sends, receives or otherwise utilizes telecommunication information) to be used at the customer premises without fear that the appliance might be incompatible with a particular telecommunication service provider's standards. Moreover, a demarcation device might serve to couple a plurality of external and/or internal transport media, allowing interoperation among them all, and provide the same isolation features among all of these media.

In this way, certain aspects of the demarcation devices can allow for sales of a wide variety of CPE on a consumer electronics model, instead of the proprietary model necessitated by many of today's telecommunication networks, where, for example, differing implementations of xDSL among providers virtually force consumers to purchase modems supplied or approved by a particular provider to ensure compatibility between the modem and the provider's xDSL implementation. By isolating the topologies of the external and internal transport media, embodiments of the present invention can create a disclosed interface between the provider's network and the customer's network, allowing much greater flexibility in both the provider's networking options and the customer's choice of telecommunication appliances. Those skilled in the art will recognize that these and many other benefits can flow from embodiments of the invention.

In accordance with other embodiments, the isolation abilities of demarcation devices also can allow a demarcation device to serve as an insulator between different transport media coupled to the internal and external transport media in order, for instance to prevent unwanted telecommunication information from one network from entering the other network. For instance, a demarcation device in accordance with particular embodiments can serve to prevent propagation of certain telecommunication information from an internal network (including particular signals or frequencies) into one or more external transport media, preventing interference in the internal transport medium from interfering with the telecommunication service provider's network. In similar fashion, demarcation devices can prevent the contamination of the internal transport medium with unwanted information from the external medium, interference between two or more external transport media coupled to a demarcation device, and unwanted interference or crosstalk between multiple internal media.

The ability of a demarcation device to isolate the internal transport medium from the external transport medium also allows demarcation devices in some embodiments to be used to provide enhanced security for the customer and/or control customer access to certain features or services. For instance, those skilled in the art will recognize that a demarcation device can prevent unauthorized access (by a telecommunication service provider and/or a third party) to the customer's data network, or can screen or filter telecommunication information entering or leaving the customer's premises, enabling features like parental controls on incoming and outgoing information, as well as the filtering of outgoing sensitive information (such as credit card information and the like).

Further, according to certain embodiments, the demarcation device, as the consolidation point for all telecommunication information entering or leaving the customer premises, can provide a variety of enhanced features to the entire premises, including things like caller identification, premises-wide telephone, video and data distribution, content (e.g., video, audio or data) on demand, and the like. These and other features of the demarcation devices also allow for a variety of new and useful telecommunication applications to be provided to customers. Details about some exemplary applications are discussed below; given the disclosure herein, those skilled in the art can appreciate the wide variety of such applications that are possible using various embodiments of the invention.

Certain embodiments of the invention provide a variety of systems for utilizing demarcation devices. Merely by way of example, FIGS. 1A-1G illustrate several such exemplary systems. For instance, FIG. 1A illustrates a system 100 for providing telecommunication services using a demarcation device, in accordance with some embodiments of the invention. System 100 includes a distribution point 104 in communication with a demarcation device 108 via external transport medium 112. In one sense, distribution point 104 can be considered the source of telecommunication information transmitted to customer premises and the recipient of telecommunication information transmitted from customer premises 116, although, as described below, distribution point 104 often will be neither the ultimate source nor the ultimate recipient of telecommunication information. In certain embodiments, distribution point 104 can be a telecommunication service provider's local office; in other embodiments, distribution point 104 can be another network element in the service provider's network, for instance, a remote termination cabinet and/or a digital subscriber line access multiplier ("DSLAM"). In fact, distribution point 104 can be any facility or equipment operated by a telecommunication service provider that is capable of transmitting telecommunication information to, and/or receiving telecommunication information from, a customer premises.

In general, distribution points can be classified, inter alia, as discrete distribution points or complex distribution points. With respect to a particular information set, a discrete distribution point often transmits only the necessary or desired information to the NID. In contrast, a complex distribution point can transmit the entire information set to the NID. The contrast may be illustrated with regard to video distribution: A discrete distribution point may perform channel switching (at the request of the demarcation device), encoding and sending only the desired channel information to the demarcation device. In contrast, a complex distribution point might rely upon the demarcation device to perform all channel switching. Those skilled in the art will appreciate that each scheme presents relative advantages and disadvantages.

Distribution point 104 can be capable of transmitting and/or receiving any type of telecommunication information to/from demarcation device 108, and such telecommunication information can be organized into a plurality of telecommunication information sets, as necessary. For ease of description, FIG. 1A does not show any additional sources or recipients of telecommunication information in communication with distribution point 104, but, those skilled in the art will recognize that, in many embodiments, distribution point 104 can be coupled to multiple customer premises (perhaps via a demarcation device at each customer premises) and often is neither the ultimate source nor the ultimate recipient of telecommunication information. Instead, distribution point 104 often can serve as the intermediary between one or more customer premises (e.g., 116) and one or more larger telecommunication networks and/or telecommunication information providers, which, as discussed above, can include cable television networks, telephone networks, data networks, and the like. Further, many such networks (as well as, in some embodiments, distribution point 104) can be coupled to the Internet, so that distribution point 104 can serve as a gateway between customer premises and any source and/or recipient of telecommunication information that has a connection to the Internet. The interconnection of telecommunication networks is well known in the art and need not be discussed here, other than to note that distribution point 104 can be configured to transmit telecommunication information to (and receive telecommunication information from) virtually any source or recipient of telecommunication information, through either direct or indirect (e.g., through the Internet) communication. Merely by way of example, a distribution point can transmit video signals received from a television programming provider to customer premises equipment, as described in the applications referenced above. In other embodiments, distribution point 104 can be in communication with one or more other customer locations, allowing for private virtual circuits between customer premises 116 and those locations.

In system 100, demarcation device 108 can serve as the interface between external transport medium 112 and customer premises 116. As conceptually illustrated in FIG. 1A, demarcation device 108 can be attached to an external wall of customer premises 116, which provides many advantages. For instance, if the telecommunication service provider desires to upgrade or otherwise change its network (including, perhaps, modifying external transport medium 112), a technician can perform any necessary changes at demarcation device 108 without entering the customer premises. Coupled with the ability of some demarcation devices to isolate the telecommunication service provider's network from the customer's premises, this can allow the telecommunication service provider to effect substantial changes in it network without impacting or inconveniencing the customer in any respect. This could, for example, allow the telecommunication service provider to upgrade external transmission medium 112 from a copper twisted pair to optical fiber, without requiring any topological changes inside the customer premises. Of course, demarcation device 108 also may be located at a variety of other locations, for example, within customer premises 116 or at a facility operated by the telecommunication service provider (e.g., distribution point 104). As discussed in detail below, a demarcation device may also be divided, with different portions situated at different locations, according to the requirements of the implementation.

Demarcation device 108 can communicate with CPE 120 (which can be located inside customer premises 116) through internal transport medium 124, which can comprise any of the media discussed above. In particular, internal transport medium 124 can comprise the existing telephone wiring in customer premises 116 and, in some embodiments, is capable of carrying voice, data and video information, as well, perhaps, as other types of telecommunication information, using any of a variety of multiplexing schemes. For instance, as described in Edward H. Frank and Jack Holloway, "Connecting the Home with a Phone Line Network Chip Set," IEEE Micro (IEEE, March-April 2000), which is incorporated herein by reference, the Home Phoneline Networking Alliance ("HPNA") standards allow for simultaneous transmission of both voice information and Ethernet frames across twisted-pair copper telephone wiring.

Thus, telecommunication information received by distribution point 104 from any source (for instance, those discussed above) can be transmitted from distribution point 104 through external transport medium 112 to demarcation device 108. Demarcation device 108 can then transmit the information through internal transport medium 124 to CPE 120. Likewise, telecommunication information can be transmitted via the reverse path to distribution point 104, where it can, for instance, be transmitted to an information recipient, such as a service provider (for instance, to request a pay-per-view movie or the like) or across the Internet to a recipient (such as in the case of an email message).

In certain embodiments, demarcation device 108 can receive configuration information, in some cases from a control point (e.g., 128), which, in the illustrated embodiment, is associated with distribution point 104. In certain instances, control point 128 can be software and/or hardware operated by a telecommunication service provider for controlling certain features of the operation of demarcation device 108. For instance, control point 128 can instruct demarcation device 108 to provide (or cease to provide) a particular telecommunication service (e.g., video distribution) to customer premises 116, or to control how many information sets and/or transport media demarcation device 108 should accept at any given time. Control point 128 can also provide other direction to demarcation device 108, including, for instance, instructions to save or record a particular information set (e.g., data representing a movie), such that the information set may quickly (and, in some cases), repeatedly be transmitted to customer premises 116, allowing the provision of voice, data, video, etc. on demand. Control point 128 can further be used to test the availability, functioning and/or performance of demarcation device 108, and/or any of the transport media attached thereto. Merely by way of example, control point 128 can be used to perform a loop test, known to those skilled in the art.

Often, it may be beneficial to allow the customer to provide configuration information to demarcation device 108. Thus, in certain embodiments, control point 128 can have a web interface, such that the customer (or any authorized person, such as an employee of the telecommunication service provider or telecommunication information provider) may log on to the web interface and configure options for demarcation device, perhaps resulting in configuration commands being transmitted from distribution point 104 to demarcation device 108. In other embodiments, control point 128 can be a web interface to demarcation device 108 itself, allowing the customer (or, alternatively, a telecommunication service provider or telecommunication information provider) to configure demarcation device 108 directly. In still other embodiments, control point 128 can communicate with demarcation device through an application programming interface ("API"). Hence, in some aspects, control point 128 can interface with demarcation device 108 through an API.

Those skilled in the art will recognize that, in some embodiments, an API can include a set of software, hardware or firmware routines or libraries that may be invoked programmatically to configure or relay information to demarcation device 108. In that sense, then, control point 128 can be understood to be a program running on a computer (perhaps located at distribution point 104 or customer premises 116, among other locations) that provides configuration information to demarcation device via using a software API. In other embodiments, however, an API can include a physical interface (perhaps adapted to communicate using any of the transport media discussed herein), that may be accessed remotely and/or locally, for instance, by a service technician.

Merely by way of example, a service technician could visit customer premises 116, attach a laptop computer (or other configuration device) to demarcation device 108, and upload information to demarcation device 108, including perhaps both configuration information and other telecommunication information. In still other embodiments, demarcation device 108 can accept configuration information through other means, including merely by way of example, providing a web interface (especially in embodiments where demarcation device 108 is capable of acting as a web server, as discussed below) and/or receiving a specially-formatted electronic message, either of which could be considered a control point in such embodiments.

As described below, demarcation device 108 (and/or particular components thereof) can be addressable/and or programmable (e.g., through control point 128). As such, demarcation device 108 can include a storage device, which can be any device known to those skilled in the art as one capable of storing information (including, merely by way of example, any of the memory and/or storage devices discussed below), for storing configuration information received from control point 128. As discussed below, the storage device can also store other telecommunication information.

Configuration information can be any set of data or other information that can be interpreted by demarcation device 108 as operational instructions, including, but not limited to, commands to process certain information sets in certain ways (e.g., provide protocol conversion, allow transmission of the information set, deny transmission of the information set, direct transmission on a particular interface, and the like), commands to provide (or cease providing) a particular service (e.g., to provide access to a pay per view movie or an additional telephone line). Thus, in certain aspects, a telecommunication service provider can control the services provided to a customer in several ways. First, the provider can transmit a telecommunication information set to a demarcation device only if the user of that device is authorized to receive the service associated with that information set. Alternatively, the service provider could send one or more services to a customer's demarcation device regardless of the customer's authorization to use the services, and rely on the device itself to prevent unauthorized access to those services.

Those skilled in the art will appreciate that certain control methods are more well-suited to certain services than to others. For instance, with respect to cable television services, the same set of information may be broadcast to many households, and the demarcation device is well-suited to control access to those services, allowing for greater efficiency in the providing of such services. In contrast, video on demand services may be controlled at a distribution point (or elsewhere), such that a demarcation device will only receive video on demand information if the customer already has requested (and been authorized to receive) that service, and the demarcation device thus may not need to provide access control functions with respect to that service.

According to some embodiments, demarcation device 108 can implement either of these access control schemes, or both in combination, as well as others. Moreover, demarcation device 108 can, in some cases, be configured to support a plurality of schemes transparently, so the customer can, for instance, request a service from demarcation device 108 (perhaps using one of the methods discussed above), and demarcation device can relay that request to the appropriate telecommunication service provider (and/or telecommunication information provider) if necessary, as well as reconfigure itself to allow access to that service, if necessary. Of course, demarcation device 108 also can be configured to take any necessary validating or authenticating action (such as notifying distribution point 104 and/or control point 128 that the service has been requested, and, optionally, receiving a return confirmation that the service has been authorized).

In accordance with other embodiments, configuration information sent to demarcation device 108 can include one or more commands to interface with and/or control a particular home fixture in a certain way. The term "home fixture" should be interpreted to mean any outlet, fixture, or device (including without limitation those that function electrically and/or any CPE) that can be intelligently controlled. Home fixtures can include, merely by way of example, any device, outlet, or other equipment that can be included in the "smart home" or "connected home" concepts familiar to those skilled in the art. For instance, configuration information could instruct demarcation device 108 to turn on and/or off certain lights, electrical outlets and/or equipment (perhaps via additional devices), and/or to arm, disarm or otherwise monitor and/or configure a home security system. One skilled in the art, will recognize, moreover, that although termed "home fixtures" for ease of description, home fixtures can easily be located in MDUs and business premises as well.

Configuration information can also include operational data such as an IP address, routing information, and the like, to name but a few examples. Configuration information can further include instructions to modify one or more security settings of demarcation device 108. Merely by way of example, in certain embodiments, demarcation device 108 can include a computer virus scanner, and configuration information can include updated virus definitions and/or heuristics. Likewise, demarcation device 108 often will be configured with access controls (for instance, to prevent unauthorized access through demarcation device 108 by third parties, as described elsewhere in this document), and configuration information can include instructions on how to deal with particular third party attempts to access demarcation device 108 or internal transport medium 124. Those skilled in the art will recognize as well that some security settings may specify the level of access the customer has to the functions of demarcation device 108, for instance to prevent unauthorized use of certain telecommunication services, and that these settings also may be modified by received configuration information.

Based on the disclosure herein, those skilled in the art will recognize that a wide variety of configuration information can be transmitted to demarcation device 108, including those examples discussed above. Moreover, some types of configuration information may be sent periodically to demarcation device 108 to ensure that the configuration of demarcation device is current. Those skilled in the art will also recognize that configuration information can, in a sense, be considered a subset of the broader category of telecommunication information.

Figure 1B:
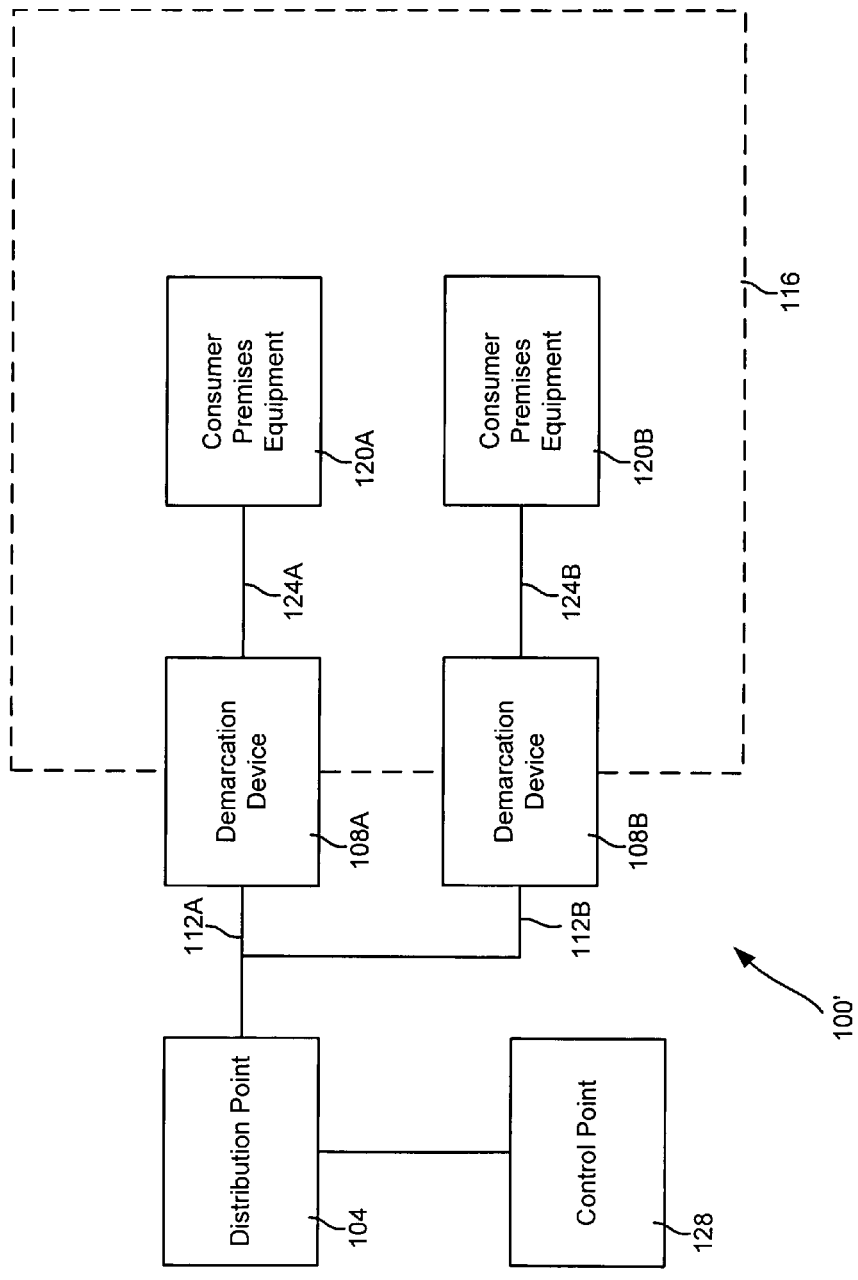

Turning now to FIG. 1B, system 100' is illustrative of certain embodiments, which can provide multiple demarcation devices 108A, 108B at customer premises 116. As noted above, demarcation device 108A can be in communication with CPE 120A through internal transport medium 124A, and demarcation device 108B likewise can be in communication with CPE 120B through internal transport medium 124B. Demarcation device 108B can communicate with distribution point 104 through external transport medium 112B which, as illustrated by FIG. 11B, can simply be spliced into external transport medium 112A (for example, using one or more active and/or passive splitting devices, which could be optical, as in a fiber environment, for example, or electrical). If necessary, demarcation devices 108 and/or distribution point 104 can include control logic to prevent unauthorized access by demarcation device 108A to telecommunication information sent to (or received from) demarcation device 108B, and vice-versa. In other embodiments, external transport medium 112B could run directly from demarcation device 108B to distribution point 104, or external transport medium 112B can be omitted, and demarcation device 108B can be coupled to demarcation device 108A, which can provide connectivity between demarcation device 108B and distribution point 104 through external transport medium 112A.

System 100' can be used in a variety of implementations. For instance, if customer premises 116 is a multiple-dwelling unit ("MDU") or a commercial building, separate demarcation devices can be provided for each separate resident, family and/or tenant (or, alternatively, a single demarcation device, perhaps with more interfaces, can service multiple dwelling or business units). In such implementations, especially when external transport medium 112B does not directly couple demarcation device 108B to distribution point 104, demarcation devices 108A, 108B can include security functionality, for example to prevent telecommunication signals intended for CPE 120A from reaching CPE 120B and vice-versa. In some embodiments, demarcation devices can provide a variety of such security, encryption and authentication functions.

Figure 2A:
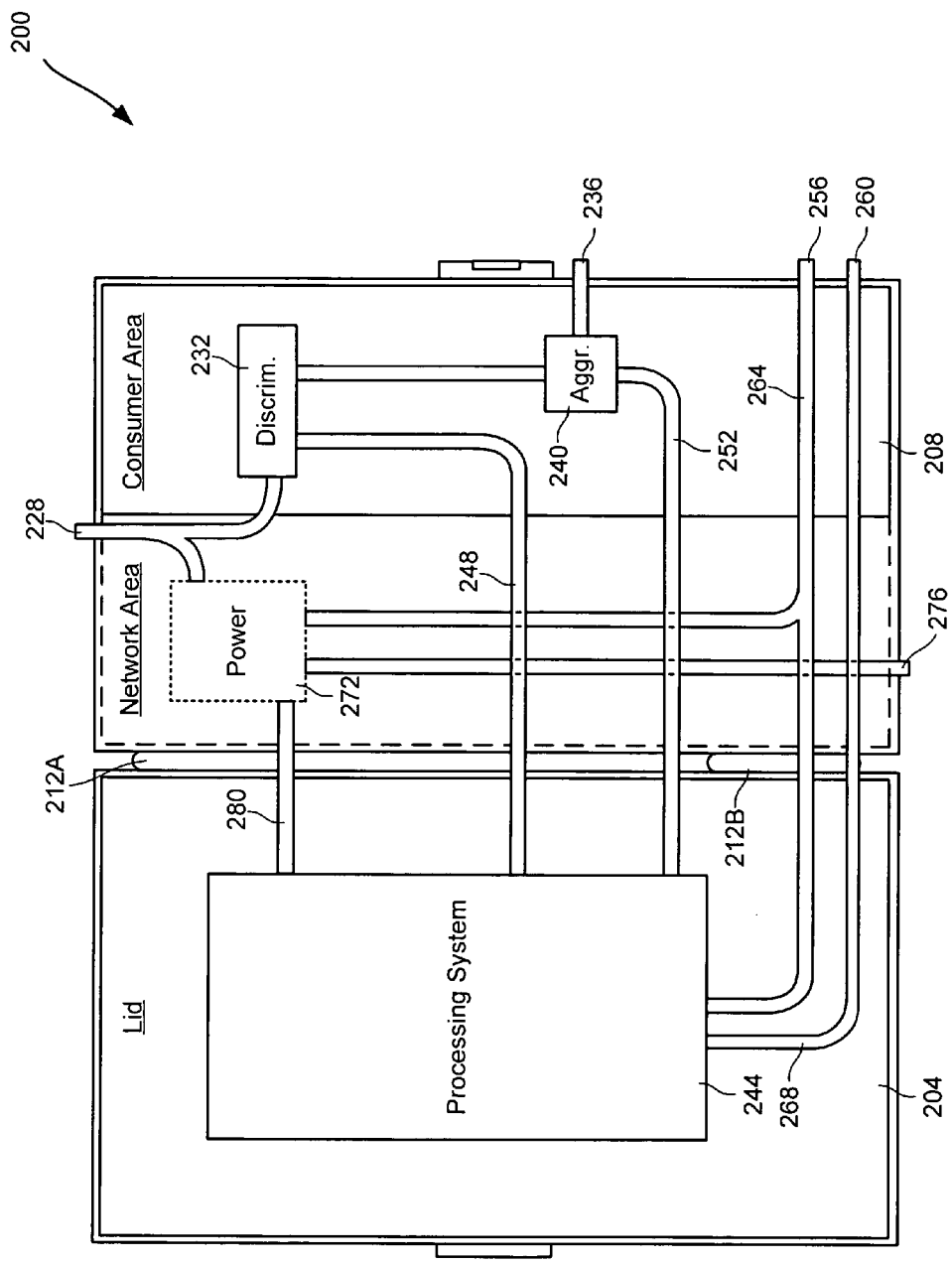
FIG. 2A illustrates a network interface device according to certain embodiments of the invention.

As described above, in certain embodiments, multiple demarcation devices 108A, 108B can be daisy-chained together (using any of the telecommunication media discussed herein). This could allow a telecommunication service provider to provide service to additional customers without requiring any additional external transport media (e.g., 112B). Similarly, demarcation devices at multiple premises can be coupled together (using wired or wireless transport media), such that if the external transport medium coupled to one of the demarcation devices fails, that device can maintain connectivity to the distribution point through its connection to another demarcation device. A demarcation device in accordance with specific embodiments thus may have an interface for securely connecting to one or more additional demarcation devices (thus, perhaps, forming a mesh network of one or more demarcation devices and/or distribution points), that would allow a particular demarcation device to serve as a conduit between another interface device and a distribution point, without allowing any unauthorized reception of telecommunication information intended for the connected interface device. This secure interface can be included, for instance, in a portion of the demarcation device that is inaccessible to customers, as illustrated in FIG. 2A and described below.

Figure 1C:
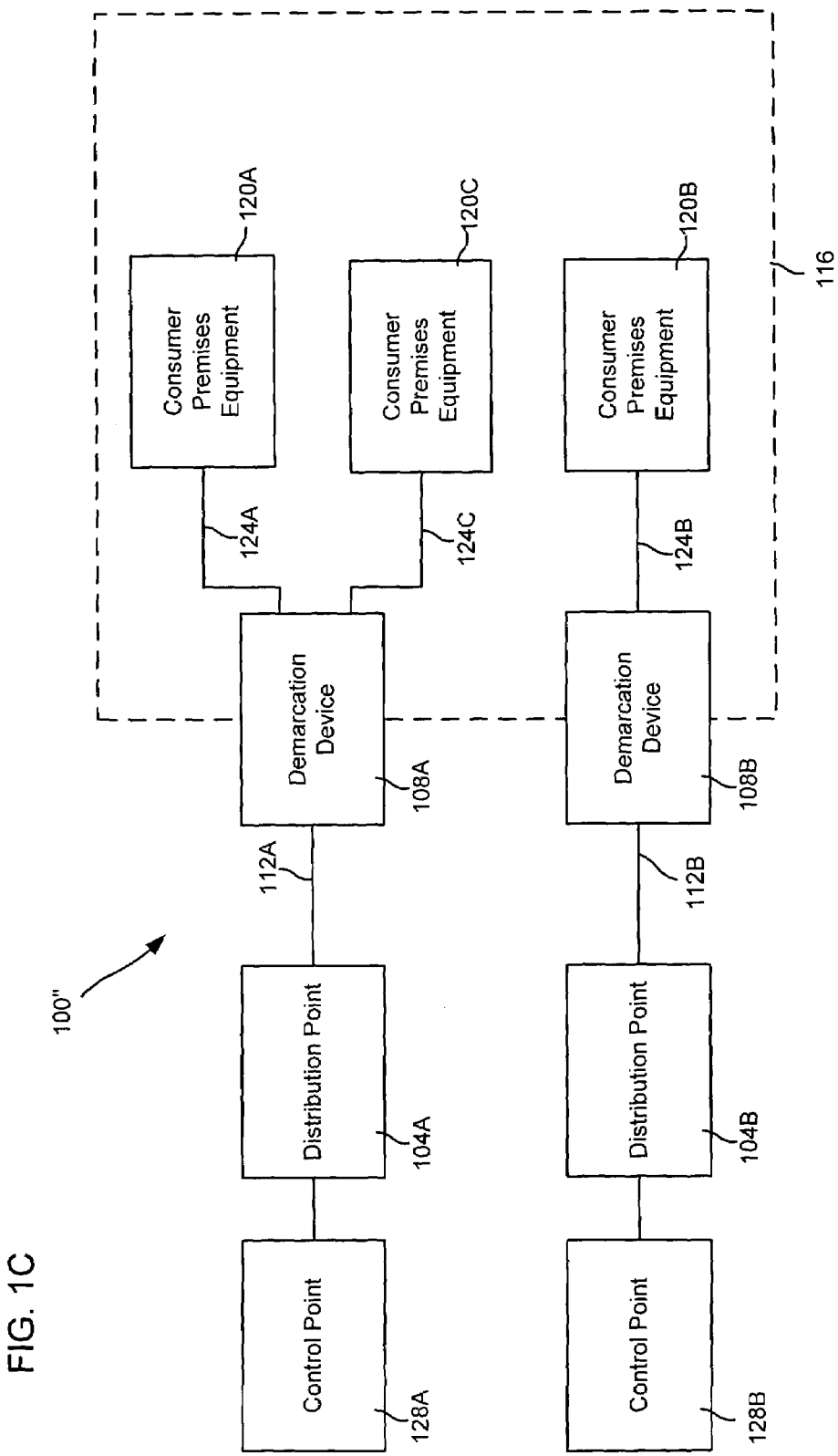

In other embodiments, a single customer premises might have connections to a plurality of telecommunication service providers. For example, turning now to FIG. 1C, system 100" includes a distribution point 104A coupled to demarcation device 108A and also includes a second distribution point 104B coupled to demarcation device 108B via external transport medium 112B. Merely by way of example, distribution point 104B could, for example, be associated with a cable television provider, while distribution point 104A could be associated with a telephone company. Thus, CPE 120A could be a telephone, and CPE 120B could be a television. (Of course, it should be noted that both telephone and video signals, as well as other forms of telecommunication information, can be provided through a single distribution point as well.) Further, as illustrated by example system 100", multiple CPE 120A, 120C can be coupled to a single demarcation device 108 (either through two internal transport media 124A, 124C as illustrated by FIG. 1C, or through a common internal transport medium, as discussed below). As described above, each demarcation device 108A, 108B, can receive configuration information from a control point 128A, 128B respectively.

Figure 1D:
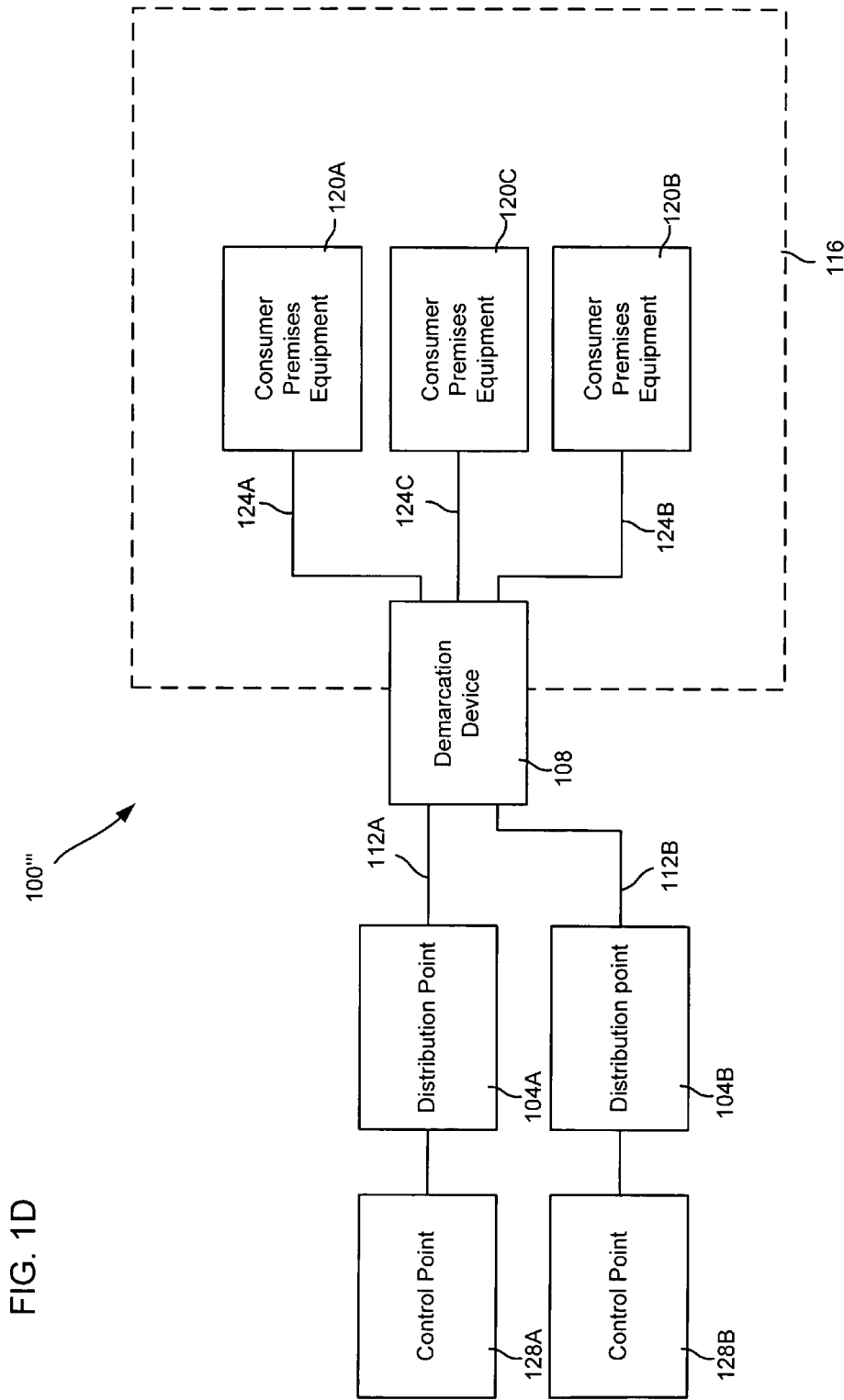

In an alternative embodiment, such as, for example system 100′″ illustrated on FIG. 1D, a single demarcation device 108 can provide connectivity to a plurality of distribution points (e.g., 104A, 104B), as well to a plurality of CPE 120A, 120B, 120C. In such an embodiment, demarcation device 108 could include attachments for multiple internal transport media 124A, 124B, 124C and multiple external transport media 112A, 112B. Moreover, as illustrated by FIG. 1D, each distribution point 104A, 104B can be associated with a different control point 128A, 128B, respectively. In alternative embodiments, a single control point could provide configuration information to demarcation device 108 with respect to both distribution points 104A, 104B.

Figure 1E:
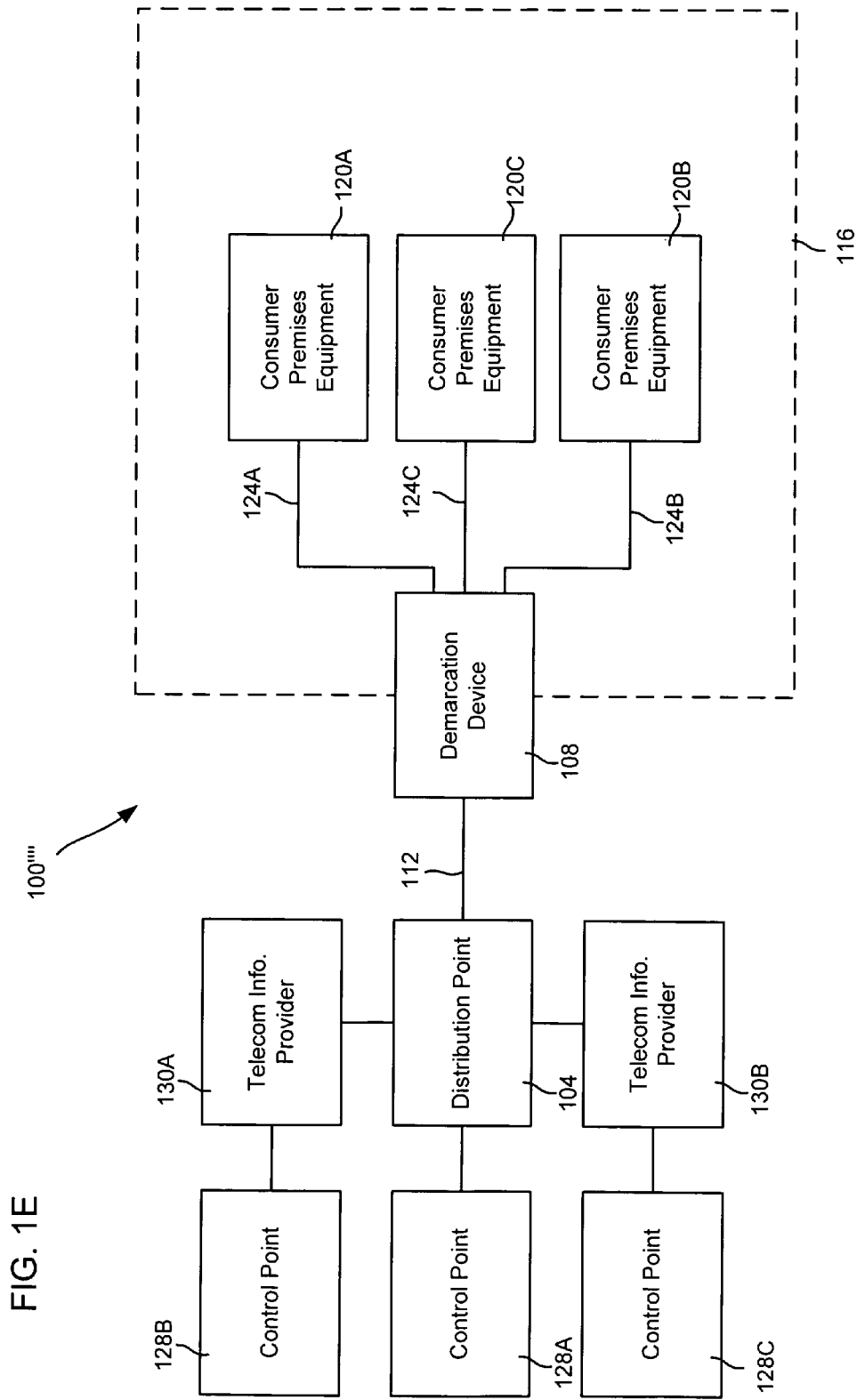

Turning now to FIG. 1E, another exemplary system 100″″ is presented in accordance with certain embodiments of the invention. In exemplary system 100″″, demarcation device 108 can be in communication with distribution point 104. In turn, distribution point 104 (perhaps operated by a telecommunication service provider) can be in communication with one or more telecommunication information providers 130A, 130B. Each telecommunication information provider 130A, 130B can be the source or recipient of one or more telecommunication information sets (each of which can be associated with a particular telecommunication service), each of which can be transmitted to (or received from) distribution point 104. Distribution point 104 can also transmit these information sets to (or received them from) demarcation device 108, via external transport medium 112. As discussed below, demarcation device 108 can be capable of processing a plurality of such information sets in a variety of ways.

In certain embodiments, each telecommunication information provider 130A, 130B can have an individual control point 128B, 128C. In some such embodiments, control points 128B, 128C can be in communication with demarcation device 108 via distribution point 104, or, alternatively, could have a separate means of communication with demarcation device 108 (e.g., via a modem and telephone line). Thus, in some embodiments, demarcation device 108 can receive configuration information from each control point 128B, 128C. As discussed above, configuration information can direct the behavior of demarcation device 108, in particular with respect to how to handle telecommunication information received from, or sent to, the associated telecommunication information provider.

In some embodiments, demarcation device 108 can be configured to accept configuration information related only to the telecommunication information and/or services provided by the telecommunication information provider sending the configuration information. In this way, demarcation device can be protected against inadvertent (or malicious) misconfiguration, which could interrupt a telecommunication service provided by another telecommunication information provider. Likewise, demarcation device 108 could be configured to automatically request updated configuration information from control point 108A associated with distribution point 104 in the case of misconfiguration, and control point 108A could maintain a master set of configuration information to be able to accommodate such a request.

In other embodiments, telecommunication information providers 130A, 130B may not have an associated control point. In such embodiments, telecommunication information providers 130A, 130B can send configuration information to control point 128A (perhaps via distribution point 104A), and control point 128A can relay that configuration information to demarcation device 108 (again, perhaps through distribution point 104). In this way the telecommunication service provider can control which configuration information is transmitted to demarcation device 108.

In certain embodiments, demarcation device 108 can submit a request for configuration information to one or more control points 128A, 128B, 128C, perhaps via distribution point 104. Such a request might be made, if, for instance, the customer would like to watch a pay per view movie. The appropriate control point (e.g., 128B) could then provide the proper configuration information to demarcation device as described above, and the configuration information could enable demarcation device to transmit the movie to customer premises 116.

Figure 1F:
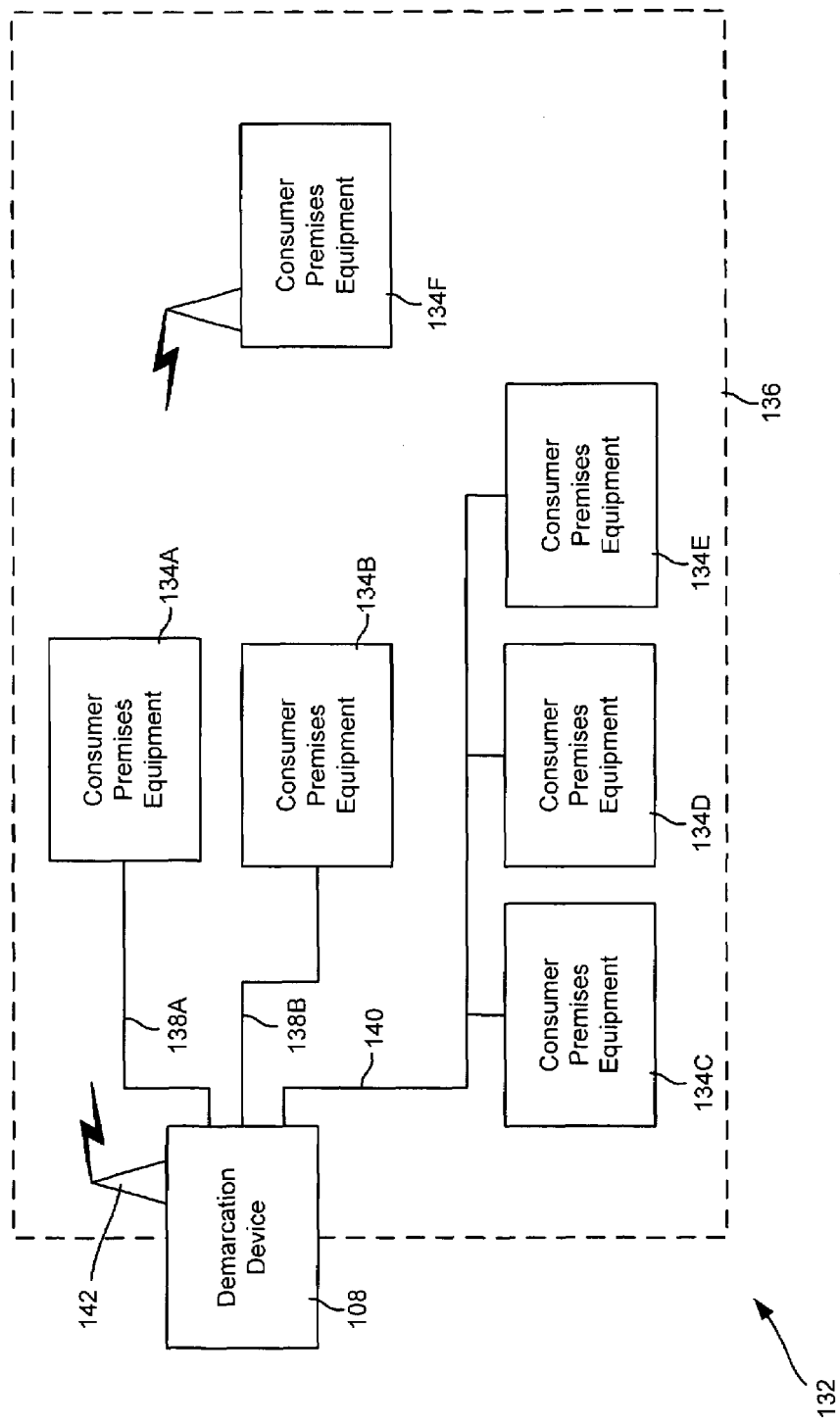

As exemplified by system 132 on FIG. 1F, embodiments of the invention enable a single demarcation device 108 to serve multiple CPE 134A-F, each of which can be a different appliance, at a single customer premises 136. For instance, CPE 134A can be a computer with an Ethernet interface, CPE 134B can be a telephone, CPE 134C can be a video game system, CPE 134D can be a set-top box attached to a television, CPE 134E can be a computer with an HPNA interface, and CPE 134F can be a laptop computer equipped with a wireless network card.

Also as illustrated by system 132, demarcation device 108 can support multiple network topologies. For instance, demarcation device 132 can serve as a hub for a point-to-point network topology, with multiple point-to-point connections to CPE 134A, 134B via internal transport media 138A, 138B, respectively. In addition, demarcation device 132 can support a bus topology, as illustrated by internal transport medium 140, which can connect demarcation device 132 to CPE 134C, 134D, 134E. Demarcation device 108 can also be equipped with a wireless transmitter 142 for communication with wireless-capable CPE 134F. In this way, demarcation device 108 can support a wide variety of networking media in customer premises 136, including the existing telephone, satellite, cable, and network wiring. For instance, the existing telephone wiring in most homes is arranged in a bus topology, as is most coaxial cable (for instance RG6 or RG59) installed by cable television providers, although each may, in some implementations, be wired using a star topology. In contrast, many homes also have 10Base-T Ethernet networks, which sometimes require a central hub. As used herein, the term "10Base-T" can be understood to include newer implementations of Ethernet over unshielded twisted pair wiring, including, for instance, 100 megabit Ethernet (100Base-T, 100VG-AnyLAN, etc.) and gigabit Ethernet (1000Base-T) standards. Demarcation device 108 can support these and other network topologies, serving as the hub in a 10Base-T network if necessary.

Figure 1G:
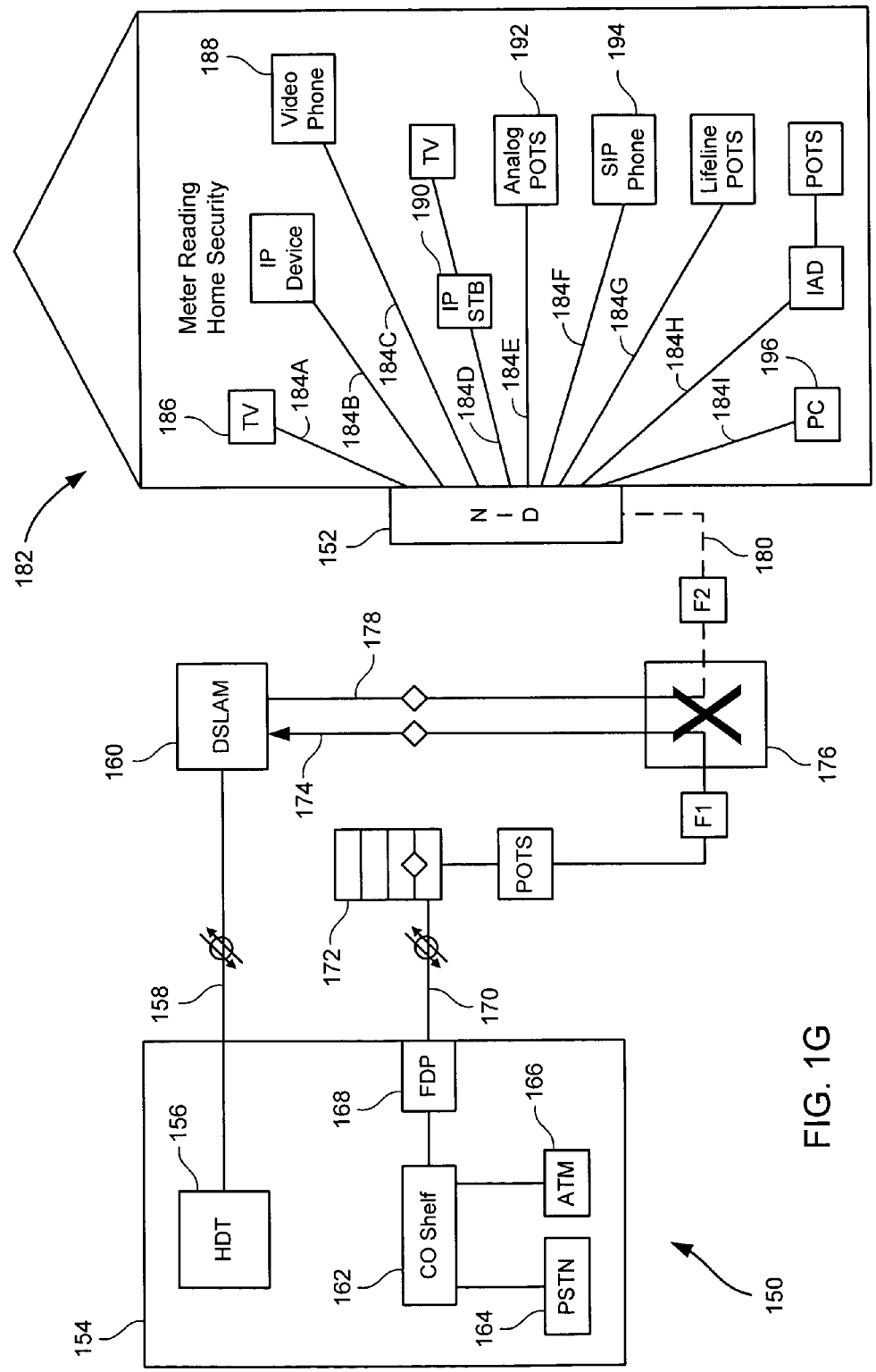

FIG. 1G illustrates another exemplary system 150 for using a demarcation device 152 in an xDSL implementation, according to certain embodiments of the invention. In some embodiments, distribution point 154 can comprise a host digital terminal 156 coupled by transport medium 158 to DSLAM 160. (As noted above, however, in other embodiments, DSLAM 160 or other equipment can be considered the distribution point.) Host digital terminal 156 can be coupled to any of a variety of data sources and/or recipients, either directly, or indirectly (e.g., through the provider's network and/or the Internet). In the illustrated embodiment, transport medium can be a Synchronous Optical NETwork ("SONET")

link (e.g., OC-3, OC-12, etc.), although those skilled in the art will recognize that other suitable transport media may be substituted.

In accordance with some embodiments, distribution point 154 also comprises a central office shelf 162 in communication with the PSTN, as well with an asynchronous transfer mode ("ATM") network 166, either of which can provide connectivity to any of the variety of data sources and/or recipients discussed above. In certain embodiments, shelf 162 is, in turn, coupled to fiber distribution panel 168, which is connected by transport medium 170 to a digital loop carrier remote termination cabinet 172. Remote termination cabinet 172 can also be coupled to DSLAM 160 by transport medium 174, which may be routed through serving area interface 176. In effect, transport medium 174 can carry one or more POTS information sets, and transport medium 158 can carry one or more non-POTS (in this case xDSL) information sets.

As illustrated, these two information sets can be combined at DSLAM 160, which is in communication with serving area interface 176 through transport medium 178. Serving area interface 176 can coupled to demarcation device 152 by transport medium 180, and in the illustrated embodiment, demarcation device 152 is fixedly attached to an exterior wall at customer premises 182. Demarcation device can then be coupled via one or more internal transport media 184A-I to a variety of CPE, including without limitation a television set 186, a video phone 188, an IP-compatible set-top box 190, an analog (POTS) telephone 192, an IP-compatible phone 194, and a personal computer 196. In this way, a demarcation device can be used to provide a plurality of telecommunication services to a customer premises.

As alluded to above, a NID is one type of demarcation device that can serve as the interface between an external transport medium and an internal transport medium. Generally, a NID can incorporate all of the functionality of the demarcation devices discussed above. In addition, in accordance with some embodiments, a network interface device also can offer enhanced functionality in the provision of telecommunication services, as described below.

Figure 2B:
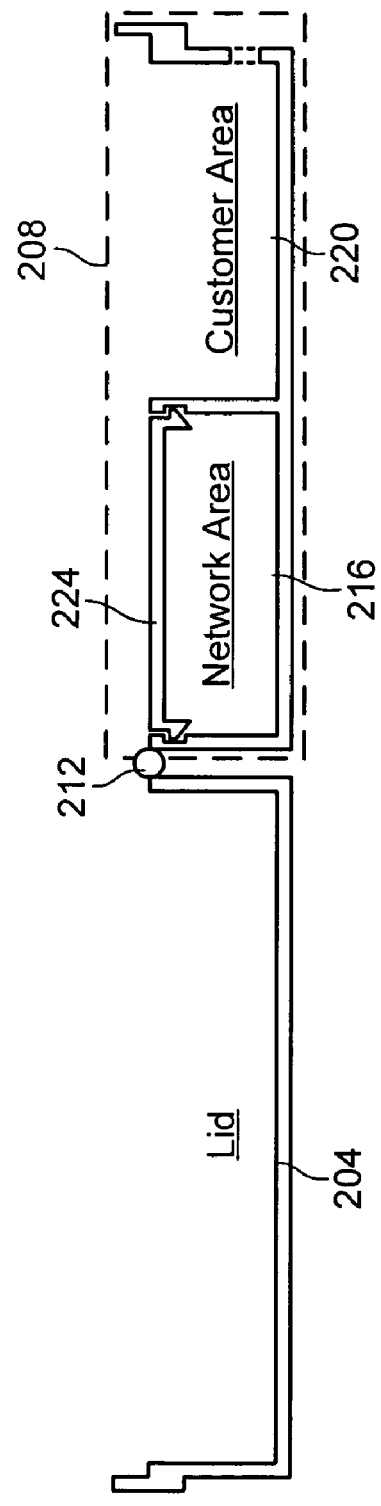
FIG. 2B is a cross-sectional drawing further illustrating the network interface device of FIG. 2A.

Turning now to FIG. 2A, one exemplary embodiment of a NID 200 is illustrated. In the illustrated embodiment, NID 200 comprises a clamshell design, with a lid portion 204 and a body portion 208 connected by hinges 212A, 212B. Turning now to FIG. 2B, it can be seen that body portion comprises a network area 216 and a customer area 220. Generally, network area 216 is adapted to receive a cover and is designed generally to be accessible only to personnel authorized by the telecommunication service provider. In contrast, when NID 200 is open, the customer can access customer area 220 to add or remove components as desired. In this and other ways, NID serves to isolate the telecommunication service provider's network from the customer's network, as described above. As discussed below, lid portion 204 can contain a processing system (not shown in FIG. 2B)

Returning to FIG. 2A, NID 200 can include a first interface 228 for communicating with the provider's external transport medium. Those skilled in the art will recognize that, in some embodiments, as described above, the external transport medium can be the twisted-pair copper "local loop" running from the customer's premises to the telecommunication service provider's local office, and interface 228 can allow for the attachment of the local loop to NID 200. As discussed above, in other embodiments, the external transport medium can be any of a variety of other media, including satellite transmissions, wireless transmissions, coaxial cable, optical fiber, etc. In fact, in certain embodiments, the external transport medium can comprise multiple transport media (of the same or different types), for which NID 200 could include multiple interfaces. In some such embodiments, NID 200 can function to logically couple or bond a plurality of external transport media to one another, seamlessly increasing the bandwith available to the customer premises. For instance, a customer premises might have a satellite link to one telecommunication service provider and an ADSL link to another provider, and NID 200 could combine or multiplex these two links to provide an apparent single, higher-bandwidth to the customer premises. Similarly, those skilled in the art will recognize that, in certain of these embodiments, a particular external transport medium (for instance, a satellite link) may be more well-suited to one way transmission of telecommunication information; in such cases, NID 200 could use a second external transport medium (for instance, an ADSL link) to allow transmission in the other direction.

Interface 228 can be coupled to a discrimination device 232, which can be operative to separate information sets received on interface 228 (and, conversely, aggregate information sets for transmission on interface 228). Merely by way of example, in particular embodiments, discrimination device 232 can separate POTS information from other telecommunication information and/or isolate signals on the internal transport medium from the external transport medium (and vice-versa). In some embodiments, for instance xDSL implementations, discrimination device 232 can comprise one or more filters. Such filters can include (but are not limited to) high-pass, low-pass and/or band pass filters. For instance, in an xDSL implementation, discrimination device 232 might include a high-pass and/or low-pass filter for separating high-frequency (e.g., data) from low frequency (e.g., POTS) information. In other embodiments, discrimination device 232 can comprise many other types of filters, including both digital and analog filters. Demarcation device 232 can be operable to separate information sets through a variety of criteria, including for example, by frequency, by destination device, information type, frequency. Further, in certain embodiments, information sets can be multiplexed (for instance, using various time-division multiplexing or wave-division multiplexing schemes known in the art) for transmission over an external transport medium, and discrimination device 232 can comprise a de-multiplexer capable of separating multiplexed signals and, optionally, routing each signal to the appropriate destination.

In the illustrated embodiment, discrimination device 232 is in communication with a second interface 236, which can interface with the telephone wires at the customer premises to provide traditional analog telephone service. In some embodiments, an aggregator 240 can be situated between discrimination device 232 and interface 236 to allow additional (perhaps non-POTS) information sets to be sent and received through interface 236 simultaneously with the POTS information. This can include, for example, aggregating information sets for transmission of an HPNA (or HPNA+) signal over an internal transport medium.

The discrimination device can also be coupled to a processing system 244, which in the illustrated embodiment is located in the lid portion 204, and all non-POTS information sets can be routed to processing system 244 for additional processing. Processing system 244 is described in detail below, but can, in general, comprise one or microprocessors, including digital signal processor ("DSP") chips, and/or memory devices, including both volatile and nonvolatile memories, as well as a variety of read-only memory devices known in the art, such as programmable read only memory ("PROM") devices and erasable programmable read only memory ("EPROM") devices (a term which should be interpreted to include electrically erasable programmable ("EEPROM") devices, in addition to other EPROM devices) and storage devices (including hard disk drives, optical drives and other media) In fact, processing system 244 can comprise the equivalent of one or more personal computers, running any of a variety of operating systems, including variants of Microsoft's Windows™ operating system, as well as various flavors of the UNIX™ operating system, including open source implementations such as the several Linux™ and OpenBSD™ operating systems.

Telecommunication information (or information sets) can be processed by processing system 244 in a variety of ways, including, for example, routing a given information set to a particular interface, transforming information (for example, encoding/decoding information and converting between different transport protocols), storing information, filtering information, and any of the other functions described herein with respect to processing systems. In certain embodiments, processing system 244 can serve as the termination point for an external transport medium; for instance processing system 244 can incorporate the functionality of an xDSL modem. In other embodiments, processing system 244 can serve to identify quality of service requirements (for instance, latency requirements for voice transmissions and bandwidth requirements for streaming media transmissions, to name a few) and enforce those requirements, ensuring that sufficient bandwidth is provided to a particular device, network segment or application to maintain the quality of service required.

In certain embodiments, for instance, as described above with respect to FIG. 1D, a NID may comprise another interface in communication with a second distribution point 104B, perhaps operated by a different telecommunication service provider, through an additional external transport medium 112A. In such a case, the additional external interface could be coupled to discrimination device 232, or it could be coupled to another discrimination device, which could also be in communication with processing system 244, interface 236 and/or aggregator 240. Thus, certain embodiments allow a single NID to serve as a communication gateway between the customer premises and multiple telecommunication service providers, including combining or multiplexing multiple external transport media (each of which may be in communication with a different telecommunication service provider and/or telecommunication information provider) as discussed above.

Returning to FIG. 2A, processing system 244 can be in communication with aggregator 240, which, as discussed above, can aggregate non-POTS information sets received from processing system 244 and POTS information sets received directly from discrimination device 232 for consolidated transmission via interface 236, among other functions. In effect, discrimination device 232 and aggregator 240 (perhaps in conjunction with processing system 244) can function to separate telecommunication information received on interface 228 into a set of POTS telecommunication information and a set of non-POTS telecommunication (wherein POTS information can be understood to be ordinary telephone signals, and non-POTS information can be understood to include all other telecommunication information), route the non-POTS information via transport medium 248 to processing system 244 for processing, and route the POTS information to interface 236 for transmission to the internal transport medium. In certain embodiments, one or more sets of non-POTS information can be routed to interface 236 using transport medium 252 for transmission through interface 236, perhaps in combination with one or more sets of POTS information.

Of course, discrimination device 232 and aggregator 240 can perform the same function in reverse (i.e., to separate and recombine different sets of telecommunication information received on interface 236 from the customer's premises). Thus, in some embodiments, both discrimination device 232 and aggregator 240 each can perform a combined discrimination device-aggregator function, depending on the direction of information flow. In fact, while termed "discrimination device" and "aggregator" for ease of description, those two devices can actually be identical, and further, their functionality can, in some embodiments, be incorporated into a single device, which could be coupled to interface 228, interface 236, and processing system 244 and could route information sets among any of those components as necessary. Moreover, as described below, the functionality of discrimination device 232 and/or aggregator 240 can be incorporated into processing system 244; likewise, discrimination device 232 can incorporate interface 228 and/or aggregator 240 can incorporate interface 236, such that discrimination device/ and or aggregator comprise the necessary components to be coupled directly to the external and internal transport media, respectively.

Discrimination device 232 and/or aggregator can also serve another function in certain embodiments: Since the external transport medium is coupled to first interface 228 and the internal transport medium can be coupled to, inter alia, second interface 236, the discrimination device and/or aggregator can serve as an isolation device for intermediating between the two media, such that when a topological change occurs in one of the media, only the NID interface need be changed, and the other transport medium is not affected. In some such embodiments, discrimination device 232 and/or aggregator 240 can serve to intermediate (including protocol translation and the like) between interfaces 232, 240, allowing either the internal or the external transport medium to be upgraded or changed without impacting the other transport medium. Of course, in certain embodiments, this isolation function also could be performed by processing system. In yet other embodiments, the isolation device might comprise a separate piece of hardware in communication with discrimination device 232, aggregator 240 and/or processing system 244.

In certain embodiments, NID 200 can have one or more additional interfaces 256, 260 in communication with processing system 244 via transport media 264, 268, respectively. Additional interfaces 256, 260 can be adapted to communicate with any of a variety of internal transport media to send/receive telecommunication information to/from the customer premises. For instance, interface 256 can be a coaxial interface for connection to RG6 and/or RG59 cable, and interface 260 can be an RJ45 and/or RJ11 interface for connection to unshielded twisted pair cable (which can, for instance, form a 10Base-T Ethernet network).

In certain embodiments, NID 200 can comprise a line driver (not shown on FIG. 2A), coupled to processing system 244 and aggregator 240. The line driver can function to allow conversion between various network formats and media, allowing a variety of different media types (e.g., twisted pair and/or coaxial cable, in accordance with the HPNA and HPNA+standards, as well, perhaps, as the customer premises' A/C wiring, in accordance, for example, with the HomePlug™ standard) to transport combined POTS and non-POTS information sets. If necessary, one or more different line drivers can be used to accommodate a variety of transport media.

The ability of NID 200 to support multiple interfaces of different types allows great flexibility in routing telecommunication information throughout the customer premises. Merely by way of example, if interface 228 receives telecommunication information that includes digitally-encoded video signals (e.g., MPEG-2 data), the information set that includes the encoded video signals can be routed by discrimination device 232 to processing system 244, which can decode the signals into an RF-modulated NTSC, HDTV and/or PAL format and transmit the signals via transport medium 264 to coaxial interface 256, where it can be transmitted via coaxial cable to one or more televisions at the customer premises. Alternatively, if the customer has a digital set-top box located at the television, the encoded signals can be routed by processing system 244 (perhaps through the appropriate line driver) to aggregator 240, where the signals can be transferred through interface 236 to the set-top box for decoding.

Similarly, in some embodiments, NID 200 might receive IP data (perhaps combined with other types of telecommunication information) on interface 228. The information set comprising the IP data can be routed by discrimination device 232 via medium 248 to processing system 244, where it can be processed, and depending on the embodiment, routed via transport medium 252 to the customer's existing telephone wiring (perhaps using interface 236, optionally in conjunction with aggregator 240 and/or one or more line drivers), routed to a 10Base-T network (perhaps transport medium 268 and interface 260), routed to a coaxial cable (e.g., using transport medium 264 and interface 256), or routed via a wireless interface (not shown in FIG. 2A). Alternatively, the IP data can be routed to any combination of these interfaces, and any of these interfaces could also receive IP or other telecommunication information from a CPE at the customer premises, for routing to processing system 244. In this way, NID 200 can allow virtually unlimited connectivity options for each CPE at the customer premises. Adding to the flexibility of NID 200, processing system 244 can include the necessary components to serve, for instance, as a cable, wireless, or xDSL modem, as well as components necessary to serve as an Ethernet hub, switch, router or gateway, the functions of each of which are familiar to those skilled in the art.

In certain embodiments, NID 200 can comprise a power supply 272 for providing electrical power to the components in NID 200. Power supply 272 can be powered through electrical current carried on the external transport medium and received on interface 228. Alternatively, power supply can receive electrical current from a coaxial interface (e.g., 256), or through a dedicated transformer plugged into an A/C outlet at customer premises, e.g., through 12V connection 276. Alternatively (and/or in addition), the NID 200 may comprise a connection with one or more sources of stored power, such as batteries, etc., each of which may be located within or external to the NID 200. The batteries, etc. may be charged and/or maintained through the power supply 272 and/or through other means, such as a dedicated transformer plugged into an A/C outlet, etc. Processing system 244 can be powered by a connection 280 to power supply 272, or through one or more separate power sources, including perhaps the A/C power of the customer premises. In some embodiments, processing system 244 might have its own power supply.

Figure 3:
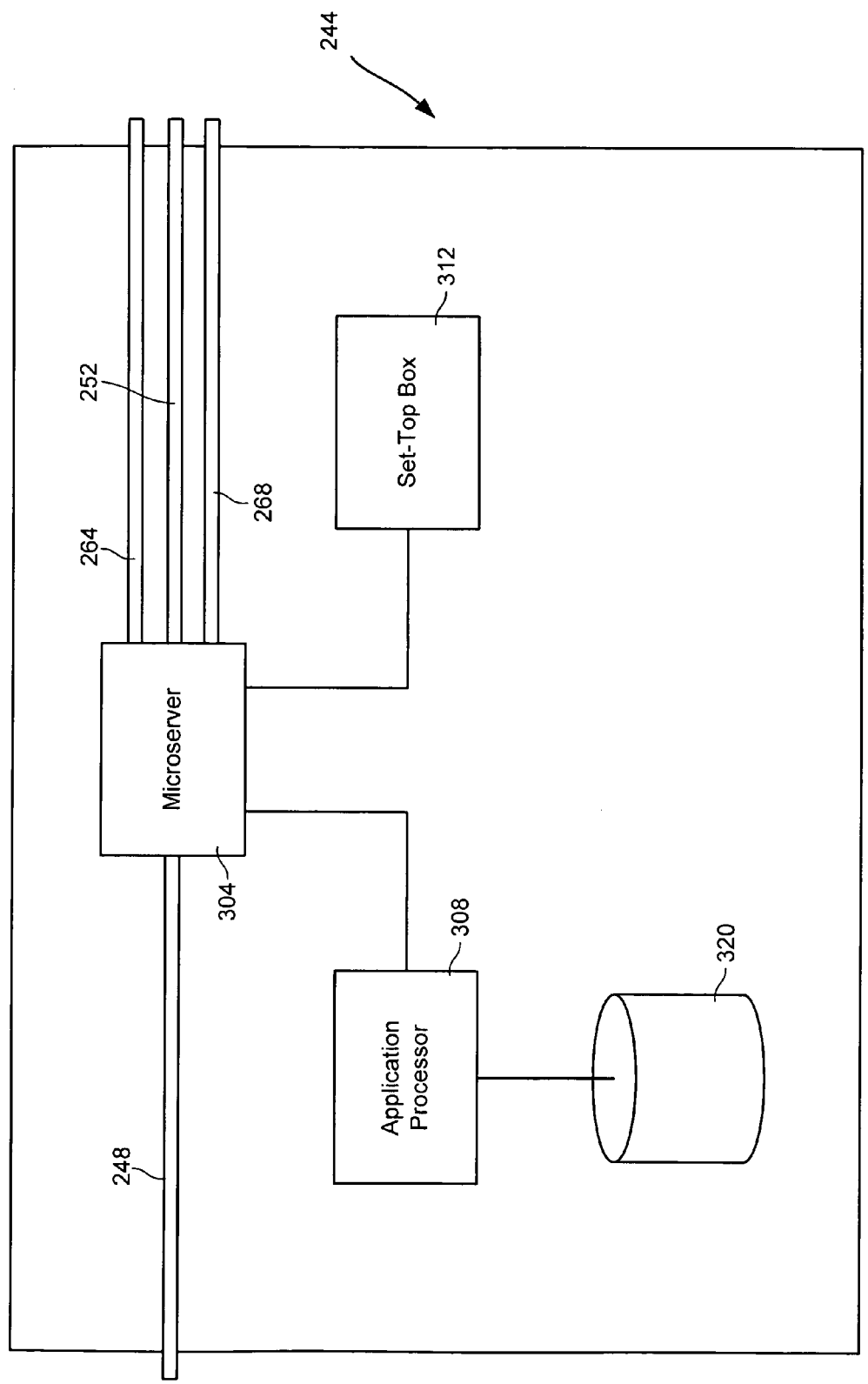
FIG. 3 is a schematic drawing illustrating a processing system that can be included in a network interface device according to certain embodiments of the invention.

As mentioned above, processing system 244 can comprise a plurality of processing devices, and each processing device can comprise multiple components, including microprocessors, memory devices, storage devices and the like. Merely by way of example, FIG. 3 provides a detailed illustration of exemplary processing system 244, which comprises multiple processing devices 304, 308, 312. In accordance with the exemplified embodiment, transport medium 248 links processing system 244 with an external transport medium (perhaps via a discrimination device and/or interface, as described above).

Transport medium 248 can be coupled to microserver 304, such that any information received by processing system 244 via transport medium 248 is first processed by microserver 304. Microserver can, in some embodiments, be the equivalent of a server computer, complete with memory devices, storage devices, and the like, each of which is known in the art and none of which is illustrated on FIG. 3. In certain embodiments, microserver 304 serves as the controller for the NID, overseeing the NID's configuration and monitoring performance; in some such embodiments, the controller functions can be accessed using a web browser. Depending on the embodiment, microserver 304 can be capable of performing a wide variety of additional functions, including functions related to administering any local area network comprised by the internal transport medium. For instance, microserver 304 can function as an xDSL modem in certain embodiments, allowing a home network attached to the NID to transmit and receive data via an xDSL connection to a telecommunication service provider. Microserver 304 can, in some cases, also function as a hub, bridge, switch or router.

Further examples of functions of microserver 304 in various embodiments include a dynamic host configuration protocol ("DHCP") server, which, as those skilled in the art will appreciate, allows for flexible configuration of an IP network using any internal transport medium attached to the NID, and a network address translation ("NAT") server, which provides some security against unauthorized use of the customer's network. Microserver 304 can also function as a HyperText Transport Protocol ("HTTP") server, which, among other benefits, can allow configuration of the NID through a convenient web interface, as well as a bridge, switch or router, which can be capable of supporting advanced routing techniques, such as MPLS and EFM, to name a few. Microserver 304 can function further to manage quality of service requirements, as described above.

In addition to these functions, microserver 304 can be configured to route information sets received via transport medium 248, according to the type of telecommunication information in the set (e.g., encoded video, IP data, etc.) as well as any addressing information associated with either the set or the information it comprises (e.g., a specified destination port or network address for a particular subset of telecommunication information). In this way, microserver 304 can serve a switching function somewhat similar to that described with respect to discrimination device 232 described in relation to FIG. 2A. For instance, if IP data is received by microserver 304, such data can be routed to an Ethernet connection, to the existing telephone wiring (e.g., in an HPNA implementation), or to any other appropriate medium (perhaps via an appropriate line driver). In fact, in certain embodiments, processing system 244 (and in particular microserver 304) can incorporate the functionality of discrimination device 232 and/or aggregator 240, rendering those components optional.

In addition to microserver 304, processing system 244 can include other components, including, for instance, application server 308 and set-top box 312, which, in the illustrated embodiment, are coupled to microserver 304. Application server 308 can comprise the equivalent of a computer, as described above, and thus can comprise one or more storage devices, such as hard disk drive 320, as well as memory devices, microprocessors and the like, to enable it to store and process telecommunication information and other data. In certain embodiments, application server 308 can perform tasks with processing, memory and/or storage requirements that render microserver 304 unsuitable, including a wide variety of consumer applications. For instance, application server 308 can act as a digital recorder for storing video (perhaps as a video-on-demand server or a personal video recorder), a file and/or application server for a home network attached to the NID, a Voice over IP ("VoIP") server, caller identification server, or voice gateway for a telephone system attached to the NID. Application server 308 can also function as a home security server, allowing the control of various features and configuration options for a home security system.

Set-top box 312, which, in some embodiments, can be coupled to microserver 304 as illustrated on FIG. 3, can provide traditional set-top box functionality (e.g., decoding of television signals, frequency switching, etc.), as well as provide enhanced features, including, for example, the provision of picture-in-picture signals for non picture-in-picture televisions, the provision of video on demand, personal video recorder features, and many other such features.

Processing system 244 can have multiple means of input and output. Merely by way of example, microserver 304 can communicate with one or more external transport media (perhaps, as discussed above, via intermediary devices) using one or more transport media (e.g., 248). Processing system 244 (and, specifically, microserver 304) also can communicate with one or more internal transport media (for example category 5, 5e and/or 6 unshielded twisted pair wire 268, RG6 and/or RG59 coaxial cable 264, and category 3 unshielded twisted pair copper (telephone) wire 252), again possibly via intermediary devices, as discussed with reference to FIG. 2A. Notably, some embodiments of processing system 244 can include interfaces for multiple transport media of a particular type, for instance, if processing system (and, in particular, microserver 304) serves as a networking hub, switch or router. Processing system 244 can also have infra-red and radio-frequency receivers and/or transmitters, for instance to allow use of a remote control device, as well as wireless transceivers, for instance to allow wireless (e.g., IEEE 802.11) networking.

As illustrated on FIG. 3, in some embodiments, microserver 304 manages the connections between application server 308, set-top box 312 and transport media 248, 252, 264, 268, routing data as necessary. In other embodiments, each processor 304, 308, 312 can have independent connections to one or more transport media.

It should be recognized that the devices within processing system 244 are described for illustrative purposes only. The functionality described above with respect to microserver 304, application server 308 and set-top box 312, respectively, each could be incorporated into a single device within processing system 244. Alternatively, their functions described herein could be divided among any number of processors and devices within processing system 244. Thus, the division of functions among devices within processing system 244 is discretionary and should not be considered to limit the scope of the invention.

Figure 4:
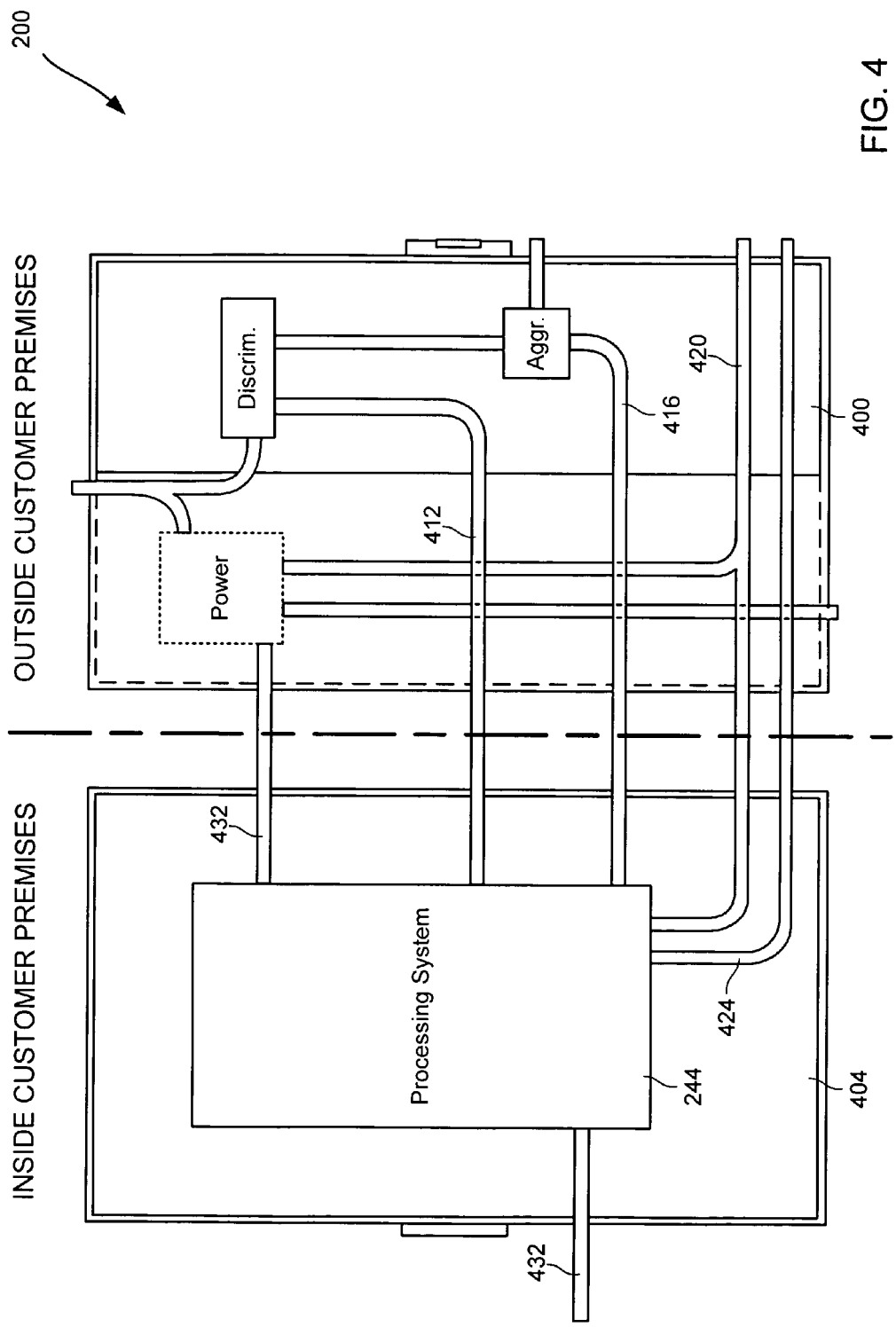
FIG. 4 illustrates a distributed network interface device according to certain embodiments of the invention.

In accordance with some embodiments, the NID might comprise multiple enclosures, each located in a different location and in communication with one another. Merely by way of example, FIG. 4 illustrates an alternative embodiment of the invention, including a NID 400 and a separate processing system 404. In the illustrated embodiment, NID 400 can include the features described above, except that processing system 404 can be located distal to NID 400. In this way, processing system 404 can be located in a more secure area (for instance, inside the customer premises), while NID 400 can be located conveniently at the exterior of the customer premises, where it can be accessed easily by service personnel. (Of course, it should be noted that a NID can also be hardened, so that it can be securely located in its entirety on the exterior of the customer premises, as, for instance, in the embodiments discussed above.) In some embodiments, processing system 404 can be in communication with NID 400 via similar transport media 412, 416, 420, 424 to those discussed with respect to FIG. 3 (248, 252, 264, 268, respectively) and can include all of the same functionality of the embodiments discussed above. As illustrated in FIG. 4, processing system 404 generally will draw power from its own source 428, although it could also be powered by NID 400, either via one of the transport media 412, 416, 420, 424 or through a separate power connection 432.

Figure 5A:
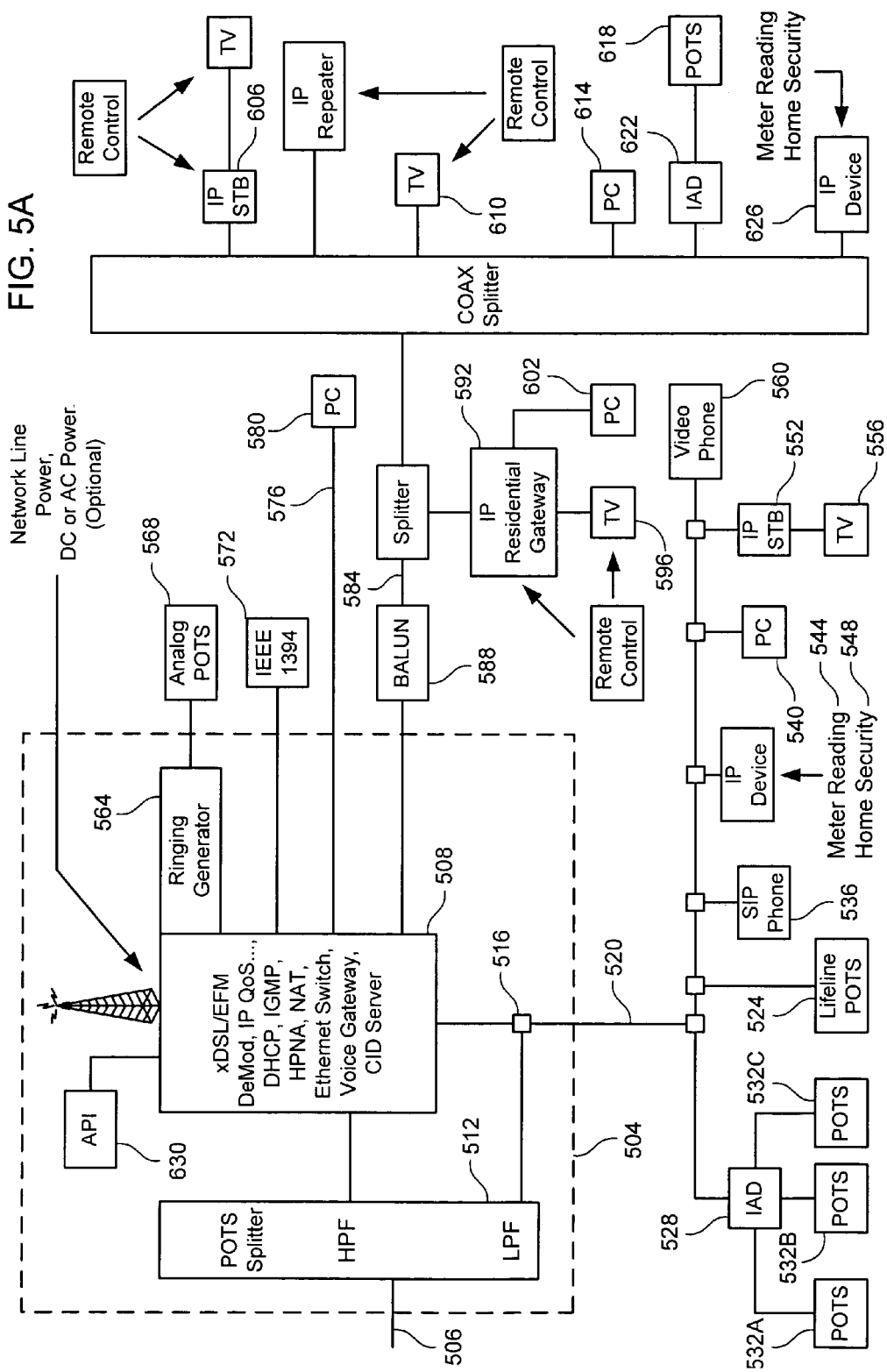
FIG. 5A illustrates a network interface device providing a variety of services to a customer premises according to certain embodiments of the invention.

FIG. 5A illustrates an exemplary system 500 in which a NID 504 in accordance with certain embodiments of the invention is interconnected via several internal transport media to a wide variety of CPE, providing many different telecommunication services. NID 504 can be in communication with a telecommunication service provider's network via external transport medium 506, which can be any of the media described above; in this exemplary embodiment, it is a twisted pair copper "local loop," capable of carrying one or more POTS data sets and one or more xDSL information sets. NID 504 can have a processing system 508 in communication with discrimination device 512, which can be a combined high pass/low pass filter. As mentioned above, discrimination device 512 can function to separate POTS information sets from non-POTS information sets, with the former routed to aggregator 516, which can serve as an interface to a category 3 twisted pair internal transport medium 520. Processing system 508 can also be in communication with aggregator 516, so that non-POTS information sets may be transmitted using transport medium 520 as well.

Attached to internal transport medium 520 (which, in the illustrated embodiment can support the HPNA standard) can be a normal POTS telephone 524, along with an integrated access device, which, among other things, can provide POTS service via IP data transmitted via the HPNA network on internal transport medium 520. In the illustrated embodiment, three additional POTS telephones 532A, 532B, 532C are coupled to the integrated access device, although those skilled in the art will appreciate that certain embodiments will support different numbers and types of devices attached to the integrated access device. Also attached to transport medium 520 is a VoIP telephone 536, as well as a personal computer 540, which can use system 500 to access the Internet, among other things.

Further embodiments can include an IP-compatible utility meter 544, which can allow a utility provider such as a city water department or electrical utility to monitor and bill utility usage over the Internet or the telecommunication service provider's network, and/or an IP-compatible home security system 548, which can allow the customer to monitor and control home security functions remotely. Via an Internet connection to NID 504, a customer on vacation could administer home security system 548, view images from security cameras, check the status of all sensors, and even turn various lights in the house on and off.

Internal transport medium 520 can also be coupled to an IP-compatible set-top box 552, which may have a television 556 attached. In addition, certain embodiments allow for a video phone 560 to be included in system 500 and attached to medium 520. Processing system 504 can also support a digital-to-analog converter 564 (perhaps with a ring generator), to allow direct connection of a POTS phone 568 to the NID, perhaps for testing purposes or for mandated life-line service.

As mentioned above, NID 504 can support a variety of other interfaces and attachments as well. For example, in certain embodiments, NID 504 (and more precisely processing system 508) can comprise one or more fiber optic interfaces, including for example, IEEE 1394 interface 572, as well a variety of standard Ethernet connections, including for instance a category 5 10Base-T interface 576 that can be used, for example, to attach one or more personal computers (e.g., 580) to NID 504, as well a wireless interface 578. Processing system 508 can also include a coaxial (RG6 and/or RG59) interface, either through use of a balun 588 (to convert, for example, from twisted pair to coaxial cable) or through a direct coaxial connection to processing system 508.

Like the other interfaces, coaxial interface 584 can support a wide variety of CPE and associated services, including transmission of both a video (e.g., HDTV, NTSC or PAL) information set and a data (e.g., IP data) information set, simultaneously. Supported devices can include an IP residential gateway, which can provide IP to HDTV/NTSC/PAL conversion for video display on a television 598, as well as direct IP connectivity, for example, to provide Internet access to a personal computer 602.

Through coaxial interface 584, NID 504 can also communicate with an IP-compatible set-top box, as well as directly with a cable-ready television 610, a personal computer 614 (either via a coaxial connection on the computer or through a balun), a POTS telephone 618 (for instance, through an integrated access device 622), or to any other IP-compatible device 626, such as a utility meter, home security system or the like. As discussed above, NID 504 can be programmable and/or addressable, and in some embodiments, NID 504 can include an application programming interface 630 to facilitate in the programming and/or addressing of NID 504.

Notably, different embodiments of the ND can provide several benefits, including simultaneous video, data and voice transmission, while maintaining required Quality of Service levels for each particular information set. Further, some embodiments of the NID can comprise a router that is capable of multi-protocol label switching ("MPLS"), which, those skilled in the art will recognize, allows the telecommunication service provider tremendous flexibility in designing the architecture of the external transport medium, including options, such as EFM and tag switching schemes (e.g., MPLS), that provide enhanced features and performance across the provider's network. Various embodiments of the NID also allow for a plurality of virtual private networks to be established through the NID, allowing one or more secure data connections from the customer premises to other locations.

Figure 5B:
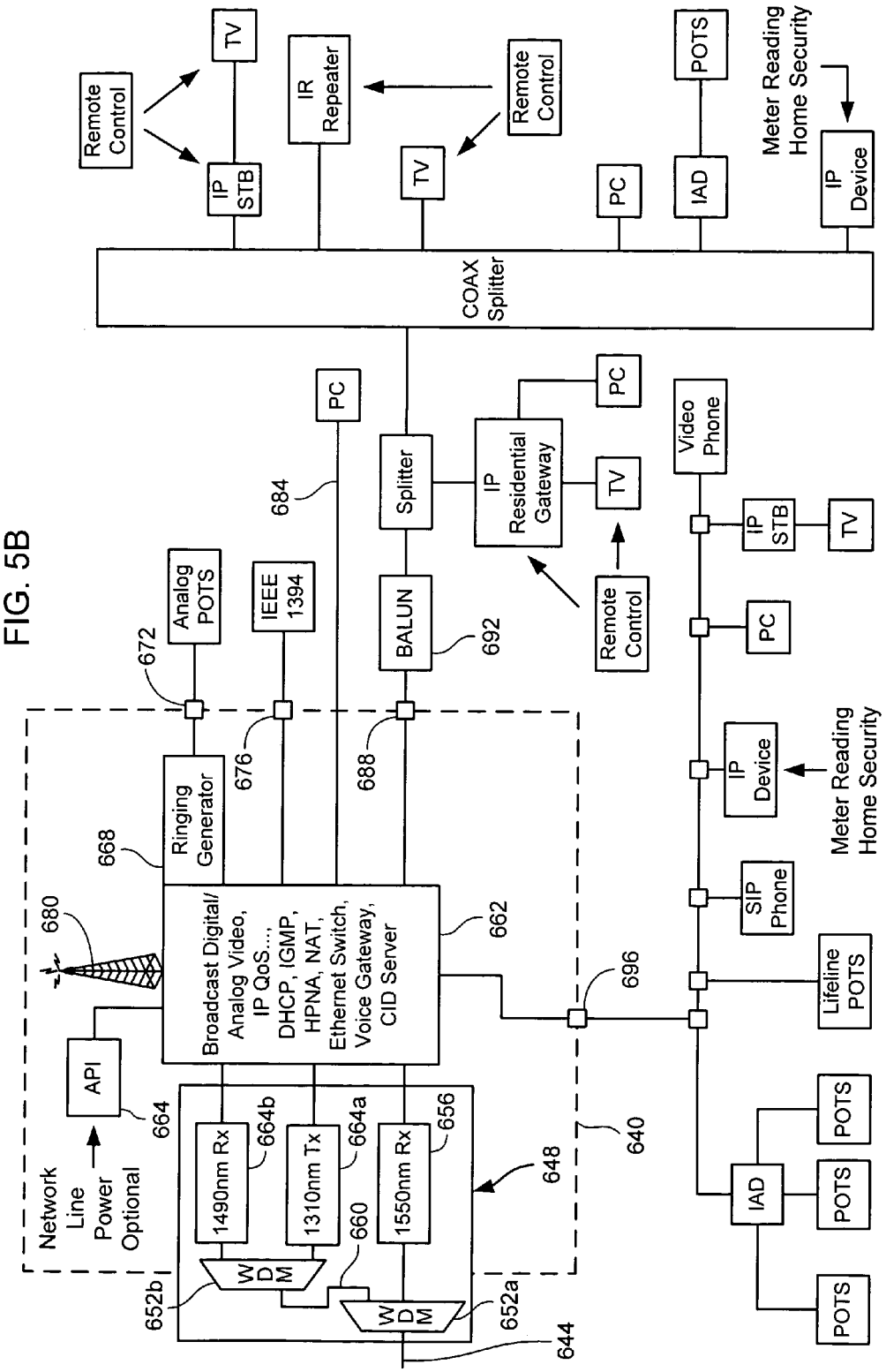
FIG. 5B illustrates a network interface device capable of providing fiber-to-the-home services to a customer premises, in accordance with certain embodiments of the invention.

In addition, as discussed herein, various embodiments of NIDs may accommodate the provision of services through a wide variety of communication media. Merely by way of example, FIG. 5B depicts a conceptual drawing of a NID 640 in accordance with particular embodiments. The NID 640 may be similar in some respects to other NIDs discussed herein, in particular, the NID 500 described with respect to FIG. 5A, above, except that this NID 640 may be in communication with a fiber-optic external transport medium 644. (It should be noted that the NIDs illustrated by the figures and described herein are merely exemplary embodiments, and that the various features described with respect to any particular NID may also be implemented by other NIDs, including those described herein, in accordance with various embodiments of the invention.) Fiber cable 644 can be any of a variety of optical fiber media, including those discussed above. In certain embodiments, fiber cable 644 can be single-stranded, such that two-way communication can be provided on the same strand (using any of a variety of methods known in the art, for example, wave-division multiplexing and/or time-division multiplexing). In other embodiments, fiber cable 644 can be multi-stranded, and/or each strand optionally can carry communication in a single direction, such that, for instance, two way communication between NID 640 and a distribution point (not shown in FIG. 5B) can be accomplished with two (or more)strands of fiber. Multi-stranded fiber can, of course, implement one or more multiplexing schemes as well.

In the illustrated embodiment, NID 640 comprises a first interface 648 that can be in communication with fiber cable 644. In accordance with certain embodiments, first interface 648 can include one or more multiplexers 652*a*, 652*b*. Multiplexers 652 can implement any multiplexing scheme know to those skilled in the art, including those multiplexing schemes discussed above. In this way, for instance, a single NID can support transmission of a plurality of information sets via a single fiber cable 644, perhaps from plurality of telecommunication information providers and/or telecommunication service providers.

For instance, in some embodiments, fiber optic cable 644 can transport both video (digital or analog) and data information sets. Merely by way of example, in the illustrated embodiment, video information can be transmitted from a distribution point at a frequency of 1550 nm, while data can be transmitted at lower frequencies. Thus, multiplexer 652*a* can separate the higher frequency video information from the rest of the transmission and can route the video information via transport medium 656. Conversely, NID 640 can route the lower frequency data information via transport medium 660, which may be in communication with multiplexer 652*b*. In some embodiments, multiplexer 652*b* can be used to aggregate and/or separate incoming and outgoing signals, for instance those on transport media 664*a* and 664*b*, respectively, according to light frequency. In other embodiments, a single transport medium 664 could transport two-way data communications; multiplexer 652*b* thus can be optional.

First interface 648 can be in communication (perhaps via transport media 656, 660, 624) with a processing system 662. In some aspects, media 816, 820, 824 can be optical media, and/or and processing system 662 can incorporate an electro-optical transducer. In other embodiments, however, first interface 648 may comprise one or more electro-optical transducers and one or more of media 656, 660, 664 can be electrical media (e.g., twisted pair wiring). In addition to electro-optical conversion, processing system 662 can perform any of the functions of the processing systems discussed above, and can include similar components to those discussed above (which are not shown here merely for the sake of brevity). For instance, processing system 662 can include an API 664, e.g., to allow the reception of configuration information.

In some aspects, life-line POTS service can be provided by NID 640 using fiber cable 644. In such embodiments, NID 640 may comprise a ringing generator 668, which can be coupled to processing system 662 and/or in communication with an analog telephone (e.g., via interface 672). In other embodiments, NID 640 may also include an interface for connecting with a second external medium, perhaps a twisted pair local loop, which could provide analog POTS service, and NID 640 could pass through the POTS signal from that second external medium, allowing connection of an analog telephone to NID 640. NID 640 can also accommodate any of the interfaces discussed above, including, for instance, an IEEE 1394 interface 676, a wireless interface (e.g. 802.11, LMDS, etc.) 680, an Ethernet interface 684, and/or a coaxial interface 688. NID 640 can also comprise a twisted pair interface 696, which can, in some embodiments, allow NID 640 to provide telecommunication services via the existing telephone wiring at customer premises. These and other interfaces can allow NID 640 to be in communication with a variety of CPE devices as shown on FIG. 5B, all of which are described elsewhere and need not be described here. Optionally, any of these interfaces may incorporate a balun (e.g. 692) or line driver, as discussed herein.

Figure 6:
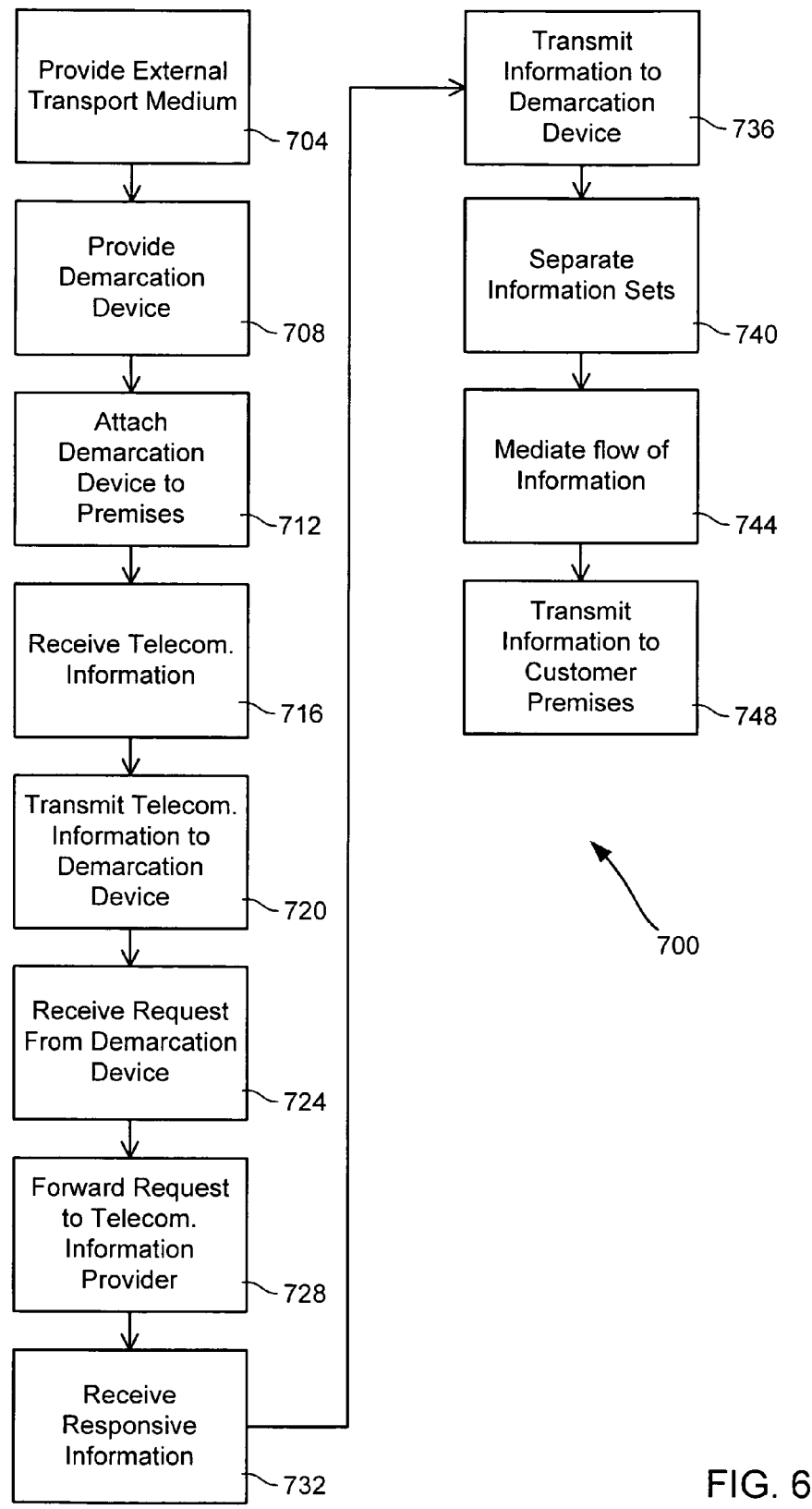
FIG. 6 illustrates a method of providing telecommunication services using a demarcation device, in accordance with certain embodiments of the invention.

Other embodiments of the present invention provide methods for using demarcation devices, and NIDs in particular. One exemplary method 700 in accordance with certain embodiments is illustrated on FIG. 6. It should be noted that the blocks displayed on FIG. 6 are arranged for ease of description only, and their order and arrangement should not be considered to limit the scope of the invention; hence, some of functions illustrated on FIG. 6 may be performed in an order different than that illustrated, or they may be omitted entirely.

In block 704, an external transport medium is provided. A wide variety of external transport media, including any of those discussed above, may be used without varying from the scope of this embodiment. At block 708, a demarcation device is provided. In a particular embodiment, the demarcation device can be a NID, as described above. In some embodiments, the demarcation device can be attached to an external wall of the customer premises (block 712), while in other embodiments, the demarcation device can be located elsewhere, including various locations at the customer premises (such as proximate to a particular CPE or coupled to an internal transport medium in an attic, garage, basement, crawl space or the like. In still other embodiments, the demarcation device could be co-located with a portion of the external transport medium, for instance in a digital loop carrier remote termination closet, at a DSLAM, or even at the distribution point.

In certain embodiments, a distribution point can receive telecommunication information from a telecommunication information provider or other source of telecommunication information (block 716). As discussed above, the telecommunication information can comprise a plurality of sets of telecommunication information, and each telecommunication information set can be associated with a particular telecommunication service. In many embodiments, the distribution point can receive the plurality of telecommunication information sets from a plurality of telecommunication information providers.

At block 720, the telecommunication information can be transmitted to the demarcation device through the external transport medium. Generally, the telecommunication information can be transmitted from the distribution point, although, as discussed above, the distribution point need be neither the ultimate source nor the ultimate destination of the telecommunication information. At block 724, the distribution point (or other facility) can receive a request, either for configuration information as discussed above, or for a particular telecommunication information set, and, in certain embodiments, the distribution point can forward that request to the appropriate telecommunication information provider (block 728). At block 732, the distribution point can receive information (e.g., telecommunication information, perhaps including configuration information) from the telecommunication information provider that is responsive to the request, and at block 736, that responsive information can be transmitted to the demarcation device, whether generated by the distribution point (and/or an associated control point) or the telecommunication information provider.

At block 740, the demarcation device optionally can separate any telecommunication information received from the distribution point (whether or not sent in response to a request from the demarcation device) into discrete information sets, according to, inter alia, any of the criteria discussed above. Once the information sets have been separated, the demarcation device can take the appropriate action for each. Such actions can include processing the information set (perhaps with a processing system similar to that described above), transmitting the information set to a particular internal transport medium (see block 748 below), consolidating the information with one or more other information sets for combined transmission onto an internal transport medium, storing the information set (perhaps to a storage device, as discussed above), and discarding the information set, among other things.

At block 744, the demarcation device optionally can mediate the flow of telecommunication information between the internal transport medium and the external transport medium. This can be done in a variety of ways, including filtering the signals and/or frequencies sent from one transport medium to the other so as to diminish interference on one network by extraneous information, signals, and/or frequencies transmitted (intentionally or inadvertently) by the other. Mediating the flow of information can also include filtering the information sent through the demarcation device, such that particular telecommunication information (and/or information sets) can be treated differently from other information (and/or information sets). For instance, as discussed above, a given information set can be processed, routed or stored differently than other sets.

At block 728, the telecommunication information (or a subset thereof) can be transmitted to the customer premises by the demarcation device. Those skilled in the art will appreciate that, that while for ease of description, method 700 has been described with respect to unidirectional information flow (from a distribution point to a customer premises), certain embodiments of the invention easily can accommodate information flow in the opposite direction, as well as bi-directional information flow. Thus, information also could be transmitted from a CPE, through the internal transport medium, to the demarcation device. The demarcation device then could separate that telecommunication information into information sets, if necessary, and take any of a variety of actions (including those discussed above) with respect to each information set, including transmitting the information in the information set to the distribution point via the external medium.

Likewise, methods in accordance with certain embodiments of the invention can support the transmission of telecommunication information from a CPE, through a demarcation device, to a distribution point, and, ultimately to a telecommunication information provider. Further, methods according to other embodiments allow for simultaneous and/or near simultaneous two-way transmission of telecommunication information.

In accordance with some embodiments of the invention, a NID may be configured to provide a relatively stable operating environment for the components contained within the NID. As discussed above, NIDs in accordance with various embodiments may comprise relatively sophisticated electrical and/or optical components, and those components may not function optimally (and/or may experience shortened operational lives) if exposed to relatively extreme temperatures and/or humidity. Thus, it may be advantageous to protect such components from prevailing external environmental conditions, such as relatively high humidity, relatively extreme temperatures, etc. One possible way to protect such components, while still allowing the telecommunication provider to access the network portion of the NID is to segregate the functions of the NID into multiple enclosures, one (or more) of which can be located inside the subscriber premises, while one (or more) of which can remain exterior to the subscriber premises. An example of such embodiments is discussed in further detail with respect to FIG. 4.

Another way to address this situation, however, is to provide a NID with a relatively controlled environment. Some such NIDs may comprise active devices for regulating the environmental conditions (e.g., the temperature and humidity, etc.) of the interior of a NID, or a portion thereof. Merely by way of example, in accordance with some embodiments, a NID may comprise a heating element, a cooling apparatus and/or dehumidification equipment, all of which are well known in the art. In accordance with other embodiments, a NID may be designed and/or located in such a way as to provide opportunities for passive environmental control. In yet other embodiments, both strategies may be pursued.

Figure 7A:
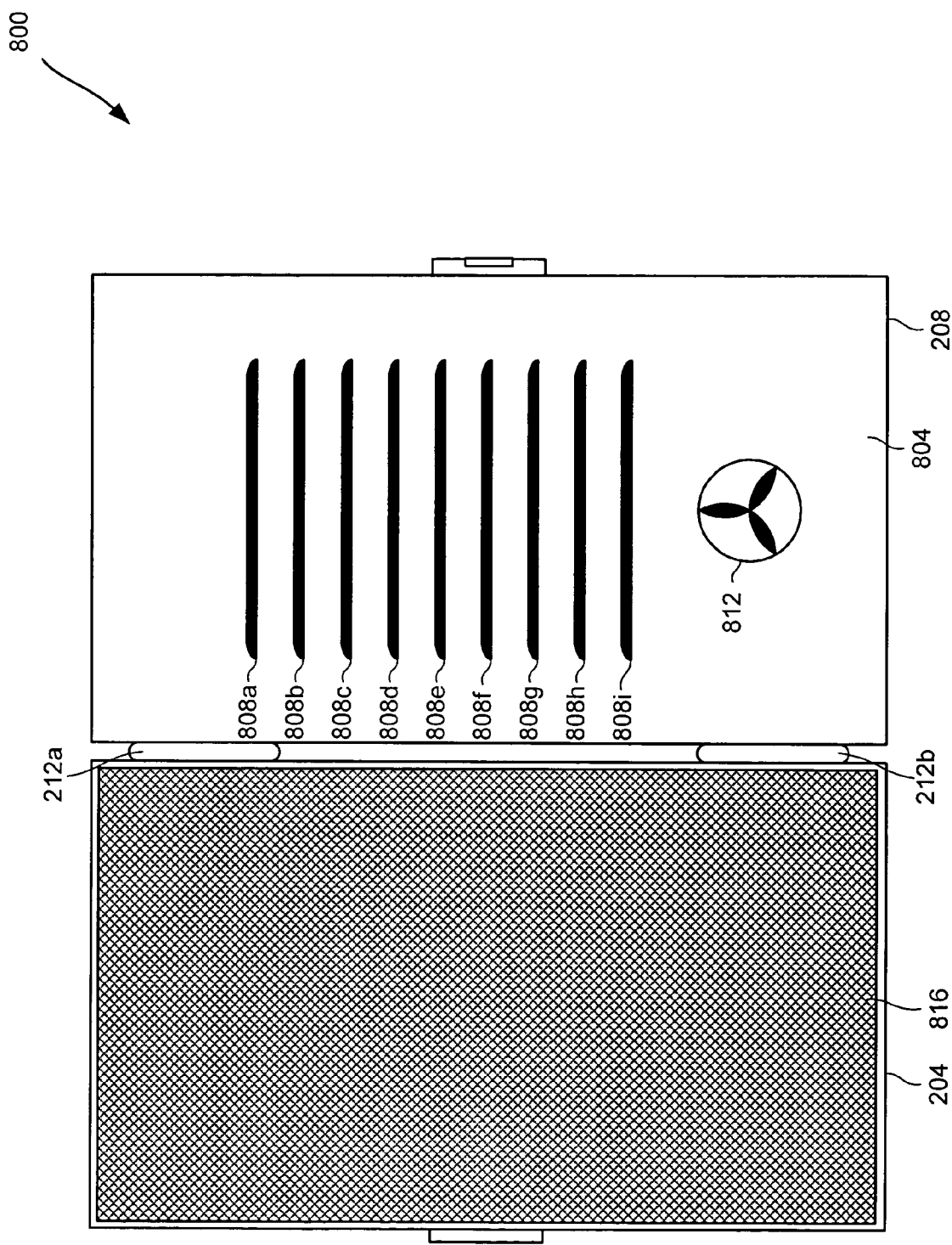
FIGS. 7A-7C, 8A-8B, 9A and 9B illustrate exemplary network interface devices that may provide a controlled environment, in accordance with various embodiments of the invention.
Figure 7B:
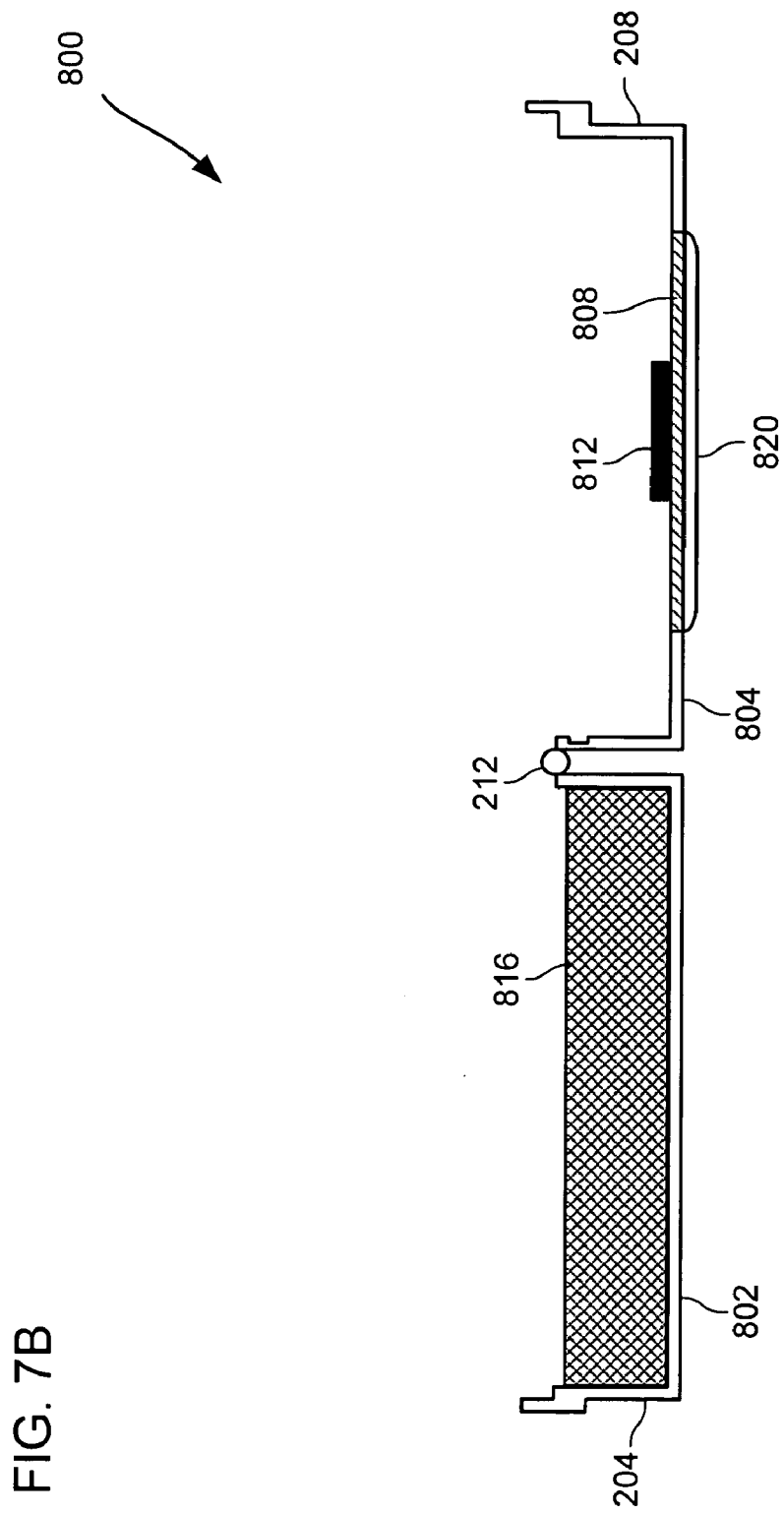

Merely by way of example, FIGS. 7A-10B illustrate exemplary NIDs that can feature passive and/or active environmental controls. These NIDs can be similar in some respects to the NID 200 illustrated by FIG. 2 and/or may comprise similar components, which are so labeled and will not be described in further detail. Turning to FIGS. 7A and 7B, an exemplary NID 800 representing one set of embodiments may comprise a lid portion and a body portion 208. The NID 800 may be configured to be attached with (and or disposed at least partially within) an external wall of a subscriber's premises, and the lid portion 204 may be considered to comprise one face 802 of the NID 800, while the body portion 208 may comprise a second face 804. The NID 800 may be configured so that the first and second faces (denoted by the reference numerals 802 and 804, respectively) are generally opposing each other, thereby defining an interior space of the NID therebetween. The lid 204 and body 208 may be constructed of a generally weather-resistant material, which may also have some insulative properties. Exemplary materials can include any of a variety of commercially available plastics, as well as metals, such as steel, aluminum, alloys, etc. (although those skilled in the art will recognize that metals generally will be less insulative than plastics), and/or any other suitable material. In some cases, the lid 204 and/or body 208 may be painted, which can improve the weather-resistance of the NID 800 as well as enhance the aesthetic properties of the NID 800.

In accordance with some embodiments, as discussed in more detail below, the NID 800 may be configured such that the lid portion 204 is exposed to the exterior of the subscriber premises, while the body 208 and/or the second face 804 is adjacent to (and/or disposed within) an external wall of the subscriber premises. Hence, the NID 800 (and, more precisely, in some embodiments, the body 208 and/or second face 804) may include one or more openings 808, which may allow for the circulation of air into the interior space of the NID 800. These openings may be adjustable (e.g., louvered, etc.) so that they may be configured to allow relatively greater or less access for air circulation. As well, the openings 808 can feature protective hoods and/or shutters 820, which can protect the openings from insertion of foreign objects, etc. and/or may be used to adjust the openings. Alternatively and/or in addition, the NID 800 may be configured to encourage thermal exchange (e.g., conduction, convection and/or radiation) between the second face 804 of the NID and the interior of the customer premises. Merely by way of example, the second face 804 may be constructed of thermally-conductive materials and/or may include baffles, etc. (such as those found on a radiator and/or a heat-sink for a computer CPU) to provide more surface area for thermal exchange.

In addition, the NID 800 may include a circulation device 812, such as a fan, impeller, etc., to actively encourage air flow in and out of the interior space of the NID 800. The circulation device 812 may be in communication with a thermostat, humidistat and/or other logic, such that the circulation device need only run when the environmental conditions of the interior space reach unacceptable threshold levels. Exemplary ways to implement such a cooling device are described in detail in, for example, U.S. patent application Ser. No. 10/611,324 filed, Jun. 30, 2003 by Casey et al. and entitled "System and Method for Cooling of Network Interface Device," the entire disclosure of which is incorporated herein by reference for all purposes.

To further reduce thermal transfer in and/or out of the NID 800, the NID 800 may include one or more insulating materials 816, which can include fiberglass insulation, vacuum chambers, air chambers, Styrofoam™ and/or any other materials that are relatively resistant to thermal transmission. In some cases, the lid portion 204 may include such insulation 816 and/or the insulation 816 may be attached and/or adjacent to the first face 802. In other embodiments, other portions (and/or the entirety) of the NID 800 may comprise insulation. In certain embodiments, however, it may be beneficial to omit insulation from the second face 804 of the NID 800, so as to encourage thermal transfer between the NID 800 and the interior of the subscriber premises, if the NID 800 is so disposed in operation.

In some cases, it maybe desirable to provide a NID that maybe empty (i.e., a NID that includes no telecommunication components) and/or may be configured to allow the easy incorporation of telecommunication components in the future. Merely by way of example, it may be desirable to provide a NID a builder for incorporation in the construction of a new subscriber premises. Because the builder may not have the necessary expertise (and/or authority) to engage in the provision of telecommunication services and/or hardware therefore, and/or because the telecommunication needs of the eventual occupant may not be known at the time of construction, it may be necessary or desirable not to provide any telecommunication components at the time the NID is incorporated in the construction of the premises. Alternatively, a telecommunication provider may wish to facilitate the addition, modification and/or upgrade of telecommunication components as technology evolves. Those skilled in the art will appreciate that there are a large variety of other circumstances as well in which it may be desirable to provide a NID that is empty and/or is configured to allow the future incorporation of telecommunication components.

Figure 7C:
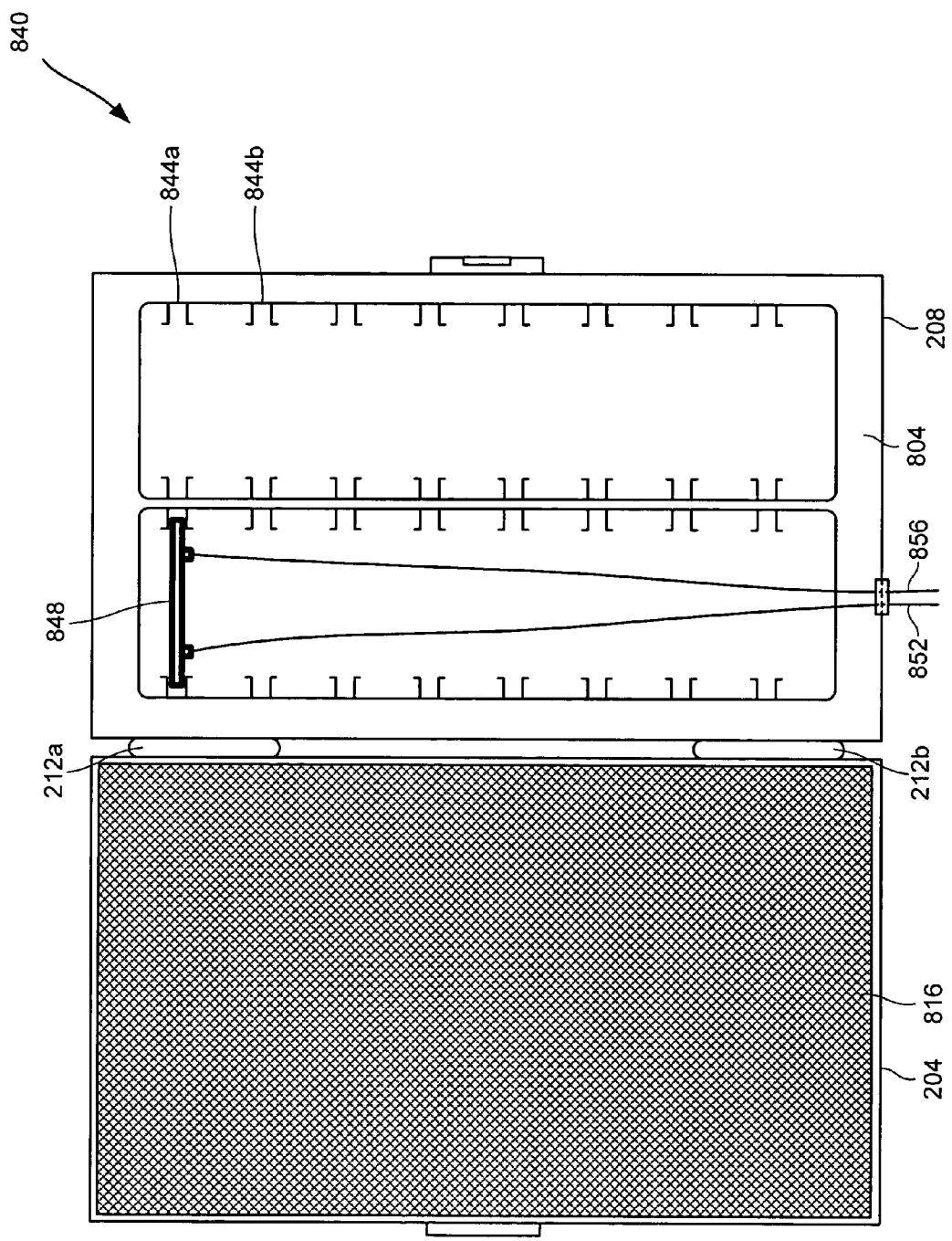

Merely by way of example, FIG. 7C illustrates a NID 840 that provides this facility. The NID 840 may comprise similar elements and/or features to the NID 800 discussed with respect to FIGS. 7A and 7B (merely for ease of illustration, some of these elements have been omitted from 7C but may be incorporated in accordance with various embodiments). In addition, the NID 840 may comprise a plurality of attachment members 844. These attachment members can be, inter alia, slots, receptacles, etc. into which various telecommunication components may be inserted or otherwise secured. Attachment members may comprise and/or utilize a variety of devices and/or components to securing telecommunication components, including without limitation notched tabs, screws and/or bolts, friction between the component and the receptacle, etc. Based on the disclosure herein, those skilled in the art will appreciate that a variety of other attachment members and/or components may be used as well. After the NID 840 has been installed at a customer premise (and/or before the NID is installed, concurrently with NID installation, etc.), one or more telecommunication components may be installed in the NID 840 using one or more receptacles 840. Merely by way of example, in the illustrated embodiment, a demarcation point 848 has been installed into the NID. The demarcation point 848 may provide for communication between an external transport medium 852 and an internal transport medium 856. Those skilled in the art will appreciate that a variety of different communication components (including without limitation those described herein) may be installed in similar fashion.

Figure 8A:
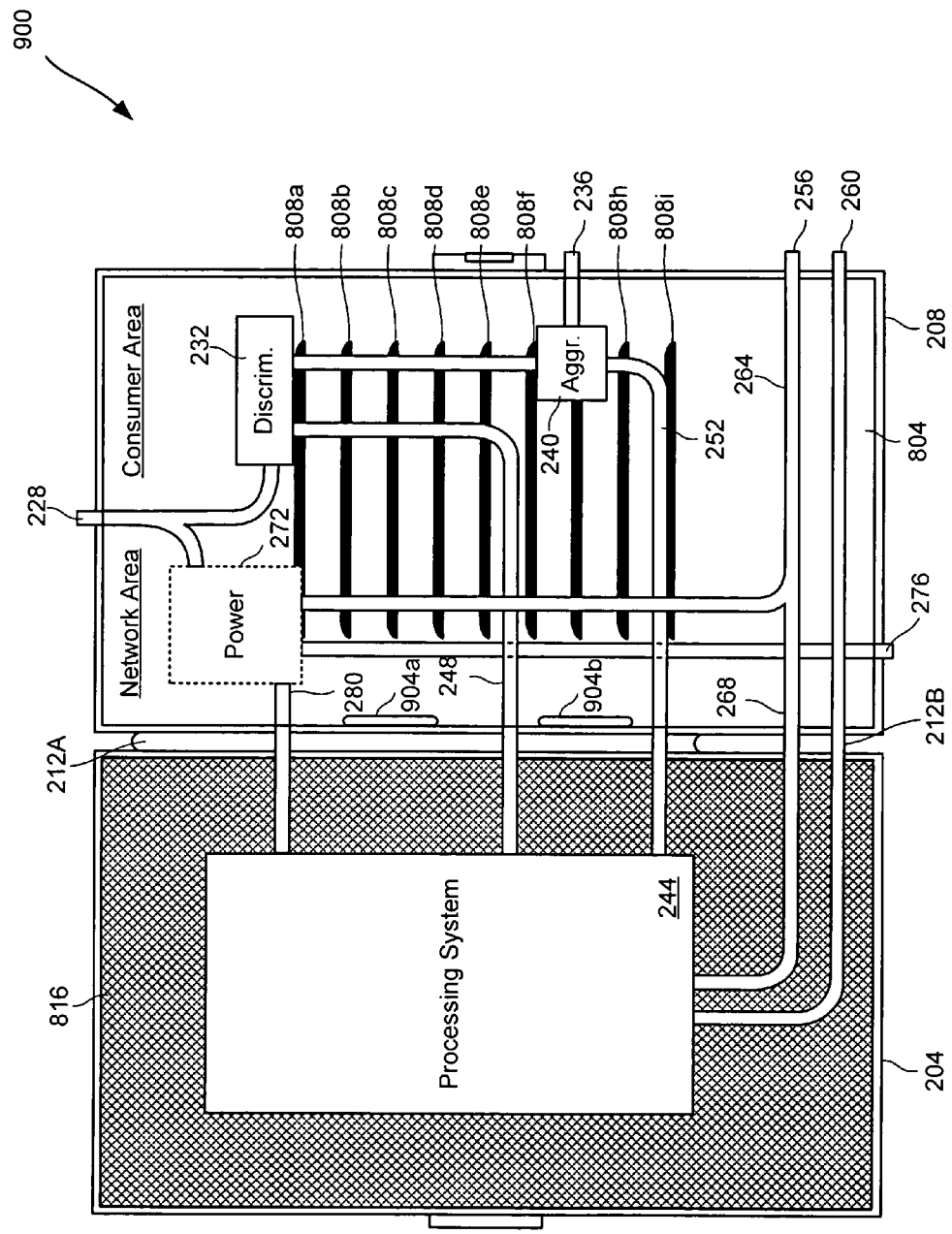
Figure 8B:
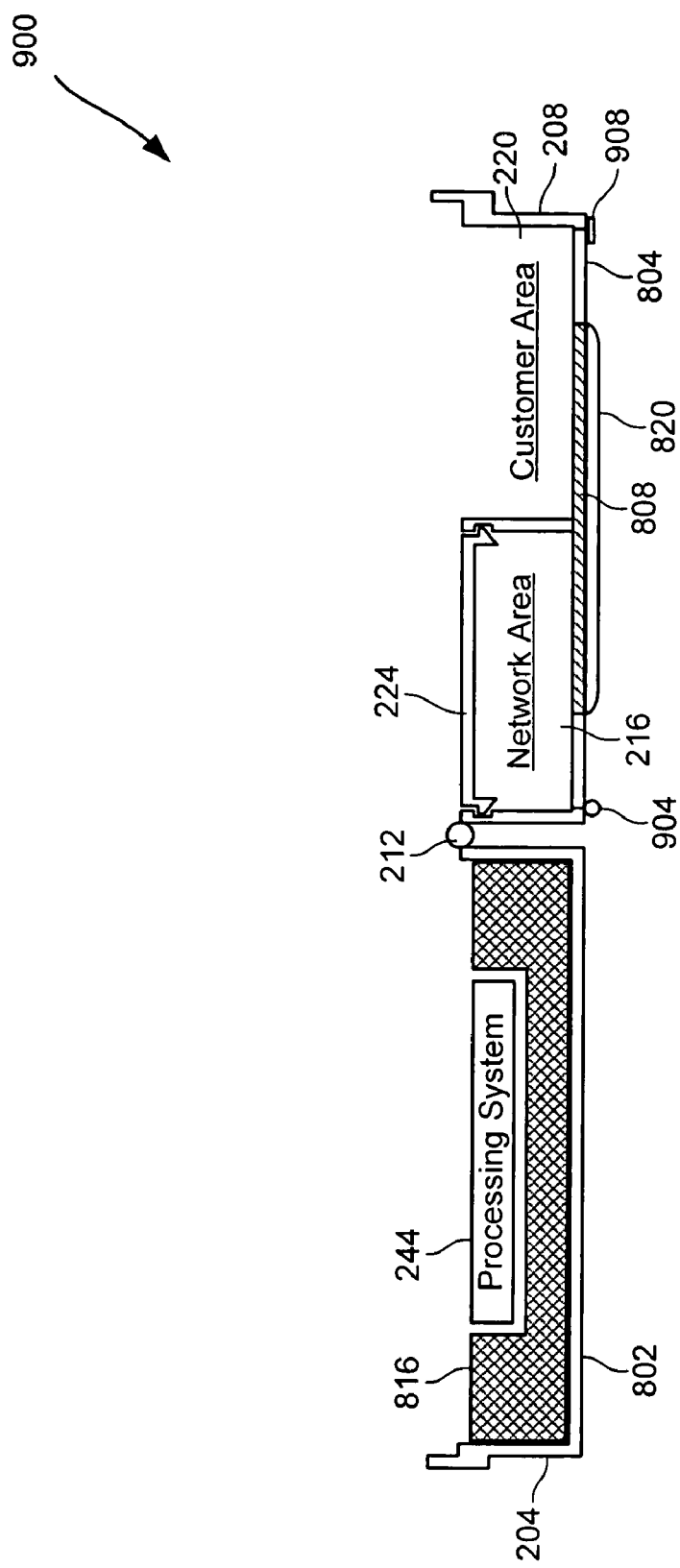

Turning now to FIGS. 8A and 8B, another exemplary NID 900 illustrates how environmentally-controlled NIDs in accordance with various embodiments of the invention may include relatively advanced components. (Some of these components are numbered similarly to their counterpart components described in detail with respect to FIGS. 2A and 2B and will not be described in further detail herein.) As noted above, in some embodiments, the insulating material 816 may be disposed within the interior portion of the lid 204. Moreover, in some cases, the insulating material 816 may be configured to allow a processing system 244 and/or other components to be disposed adjacent to, and/or within an indentation described by the insulating material 816. In other cases, the insulating material 816 may include pathways for wires, cables, conduits, etc. (such as those referenced by reference numerals 248, 252, 268 and/or 280, described above in further detail).

As noted with respect to FIG. 2, a NID 900 may have a clamshell-type design and/or may have hinges 212 allowing the lid portion 204 and the body portion 208 to be closed together. In addition, in some embodiments, one or more faces of the NID 900 (in the illustrated case, the second face 804) (or a portion thereof), may also be coupled with another portion of the NID 900 (in the illustrated case, the body portion 804) with hinges 904), which can allow access to the NID from the "back side" (i.e., the second face 804). In embodiments where the NID 900 is disposed within a wall of a subscriber premises, second face 804 (or a portion thereof) can therefore serve as an access panel, allowing a subscriber (or another) to access at least portion of the interior of the NID from within the subscriber premises. Optionally, the NID 800 may feature a security device 908, which can be configured to secure the access panel from unauthorized access via the interior space of the NID. The security device may be relatively simple, such as a latch or tab that cannot be accessed except from the interior of the subscriber premises, and/or relatively complex, such as a keyed lock to which only the subscriber (or other authorized persons) have a key. Those skilled in the art will recognize, based on the disclosure herein, that any appropriate security device may be used.

In some cases, it may be useful to allow a subscriber access to a portion of the interior of a NID but prevent access to another portion. As described above, therefore, the interior of a NID may be segregated into a "customer" area and a "network" area. In some embodiments, the customer area may allow the installation of components that may be added and/or modified by a customer, such as a cable and/or DSL modem and/or other CPE, while the network area may include components that are designed to be accessed only by qualified personnel, such as signal filters, coupling devices and/or the like. Merely by way of example, a NID may feature a latching and/or locking mechanism that allows access to a portion of the NID's interior from the interior of the customer premises, but which cannot be opened from the exterior of the customer premises, or from the network side of the NID.

Figure 9A:
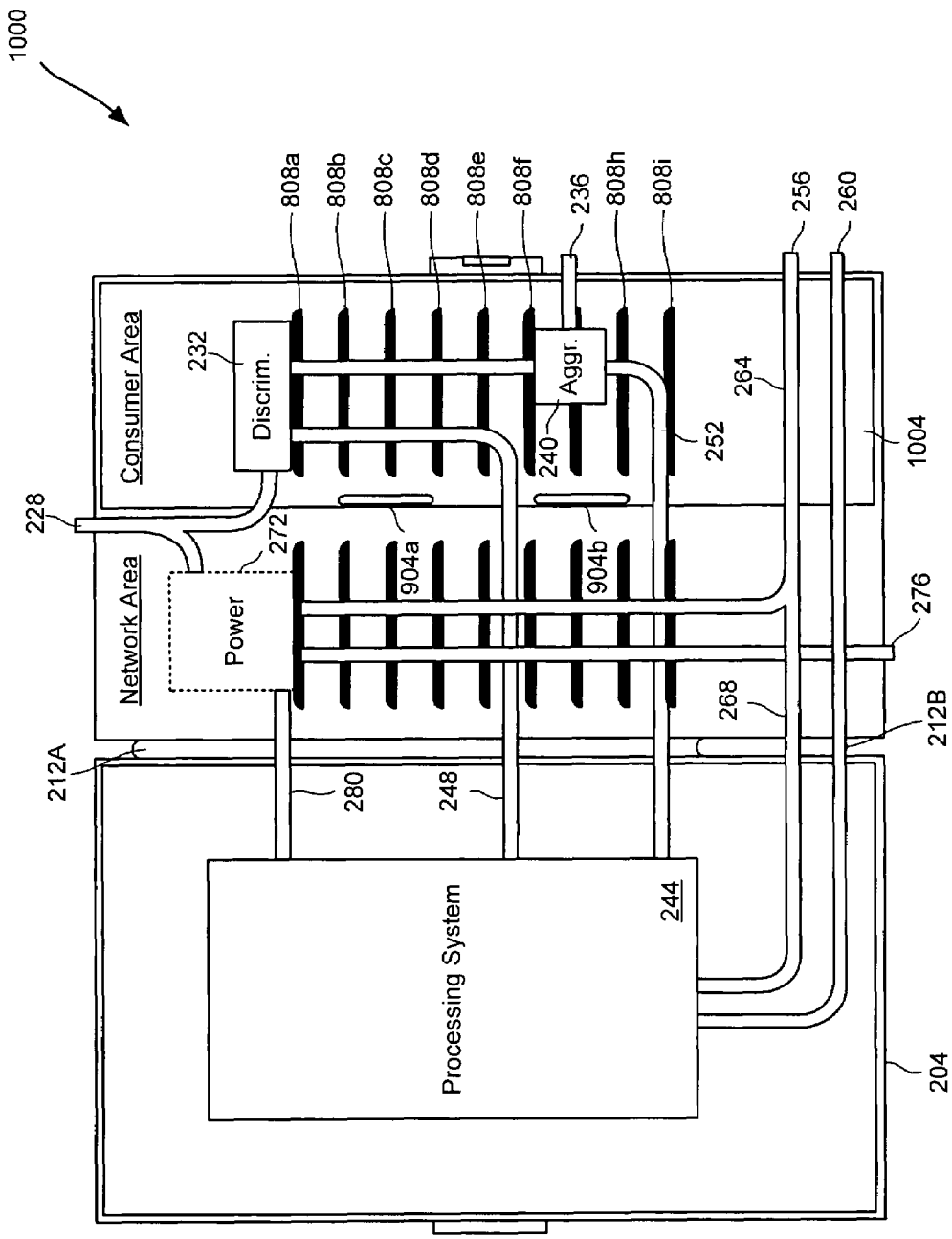
Figure 9B:
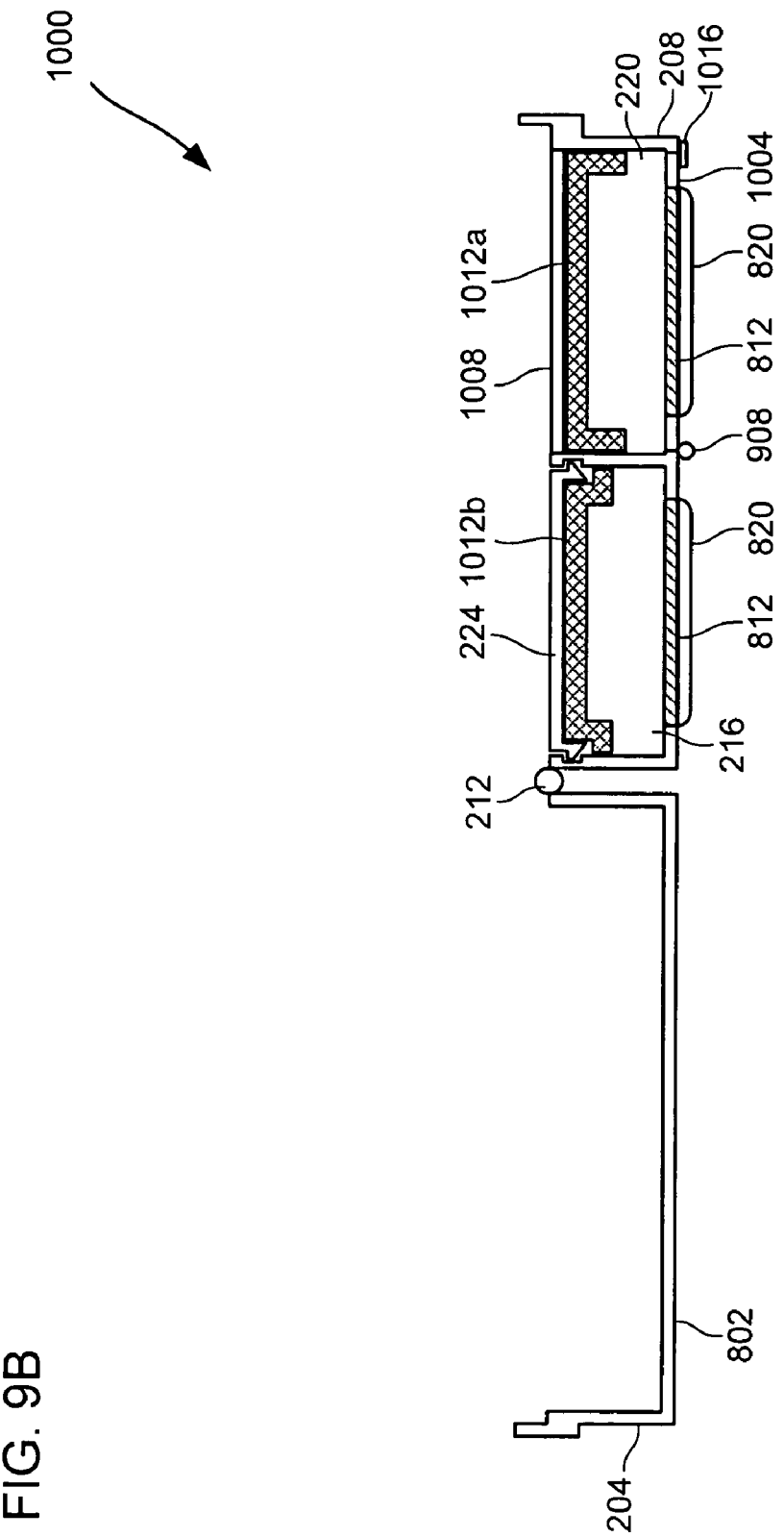

In various embodiments, therefore, one (or more) of the faces can be configured to allow limited access to a subscriber and/or to others. FIGS. 9A and 9B illustrate a NID 1000 that exemplifies some such embodiments. The NID 1000 can include many features similar to the NID 900 discussed with respect to FIG. 8 and/or other NIDs discussed herein. In addition, the NID 1000 of FIG. 9 can include one or more hinges 908 configured to allow a panel 1004 (which may be a part of and/or inset with second face 804 of the NID) to be opened, perhaps from the interior of a subscriber premises in the manner described above, allowing access to the customer area 220 of the NID 1000, while still preventing access to the network area 216 of the NID 1000. (The NID 1000 may also have a security device 1016, which may be similar to the security device 908 described above, to prevent unauthorized access to the interior of the subscriber premises from the interior space of the NID.) In this and other ways, for example, NIDs in accordance with various embodiments may allow access to merely a portion of the interior of the NID, instead of to the entirety of the NID's interior. Optionally, the customer area 220 can have a cover 1008 and/or an insulating material 1016a, which can provide additional environmental protection for the customer area 220 and/or prevent access to the customer area 220 via the lid portion 204. Similarly, the network area 216 may have a cover 224, which can prevent unauthorized access to the network area 216 via the lid portion 204, and/or an insulating material 1012b. The portions of the second face 804 covering the network area 216 and/or customer area 220 may include openings 812 and/or hoods/shutters 820, as described above. (As well, such portions of the second face may comprise other means for thermal transfer, such as thermal conduction/convection from the interior of the customer premises, as described above.) In addition, one or more circulation devices (not shown on FIGS. 9A and 10A) may be provided if desired. Further, although not shown on FIGS. 9A and 9B, insulating material may be included in/attached with the lid portion 204, as described above. (Insulating material may also be used in a similar manner in some of the embodiments depicted by FIGS. 8A and 8B.)

As noted above, in accordance with various embodiments, a NID may be disposed within a wall (perhaps an exterior wall) of a subscriber premises. FIGS. 10A-10B illustrate a wall 1100 with a NID (which can be any of the NIDs discussed herein, but for purposes of illustration is referenced by reference numeral 800) disposed therein. The wall 1100 can comprise a first side 1104 and a second side 1108 (which can, but need not, correspond to an internal side and an external side). As illustrated in FIGS. 10A and 10B, the disposition of the NID 800 with respect to the wall 1100 can expose at least a portion of the first face 802 of the NID 800 on the first side 1104 of the wall 1100 and/or at least a portion of the second face 804 of the NID 800 on the second side 1108 of the wall 1100 (in some embodiments, as illustrated in FIGS. 10A and 10B, the entire first face 802 and second face 804 are exposed).

Figure 10D:
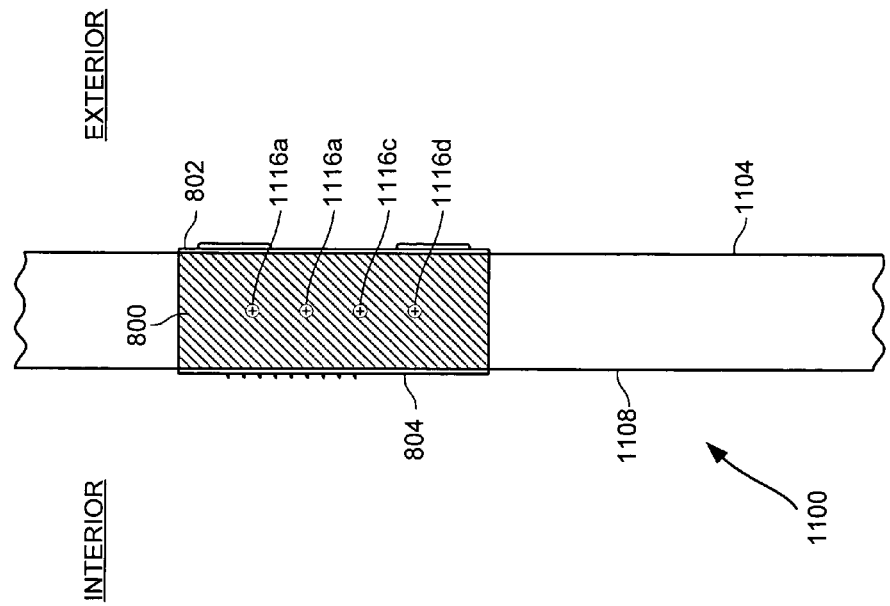
FIGS. 10-10D illustrate a network interface device that may be at least partially disposed within a wall of a premises, in accordance with various embodiments of the invention.
Figure 10C:
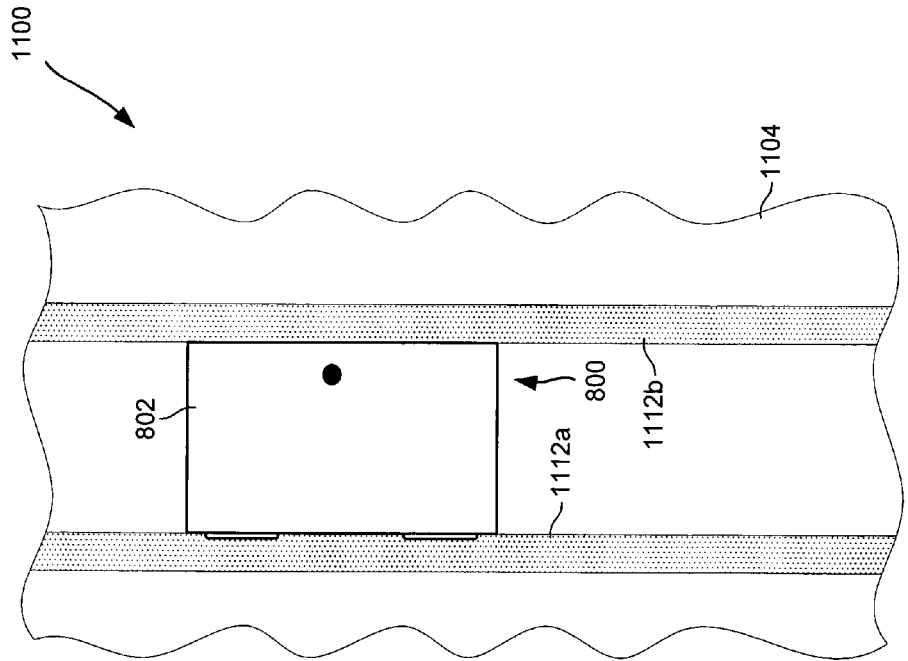

In accordance with some embodiments, the NID 800 may be configured to be positioned between two structural members (e.g., studs 1112a, 1212b), as depicted by the cutaway drawing of FIG. 10C. If desired, the NID 800 may have attachments allowing for expeditious mounting to such structural members, including, inter alia, tabs designed to be screwed and/or bolted to the structural members, holes designed to accept screws for mounting to the structural members, etc. Merely by way of example, the NID 800 of FIG. 10D is attached to a wall 1100 with a plurality of screws 1116. Also as shown on FIG. 10D, the NID 800 may be configured to be generally flush with each side of the wall, with sufficient clearance to allow a first face 802 (and/or a lid portion 204) and/or a second face 804 to be rotate open for access to the interior of the NID 800. Alternatively, a NID 800 may be configured so that a portion of the NID 800 extends substantially from one side 1104 and/or the other 1108 of the wall 1100.

In some implementations, it may be desirable to prevent the ND from being a security risk, as it may provide access to the interior of a subscriber premises. Some NIDs, therefore, can be designed to be sufficiently small that, if they are removed, the resulting hole in the wall is not of sufficient to allow an intruder to enter the interior of the subscriber premises. Alternatively, the NID may be configured to allow for secure fastening to structural members, such that it may not be removed easily. In either case, the NID may also be configured to prevent easy access through the lid and/or an access panel to allow an intruder to reach through the NID into the interior of the subscriber premises. Merely by way of example, the lid and/or an access panel may include a locking mechanism (which may be keyed on the exterior side and/or may be accessible only from the interior of the subscriber premises. Alternatively (and/or in addition), the access panel may be small enough to prevent such "reach through."

Figure 11:
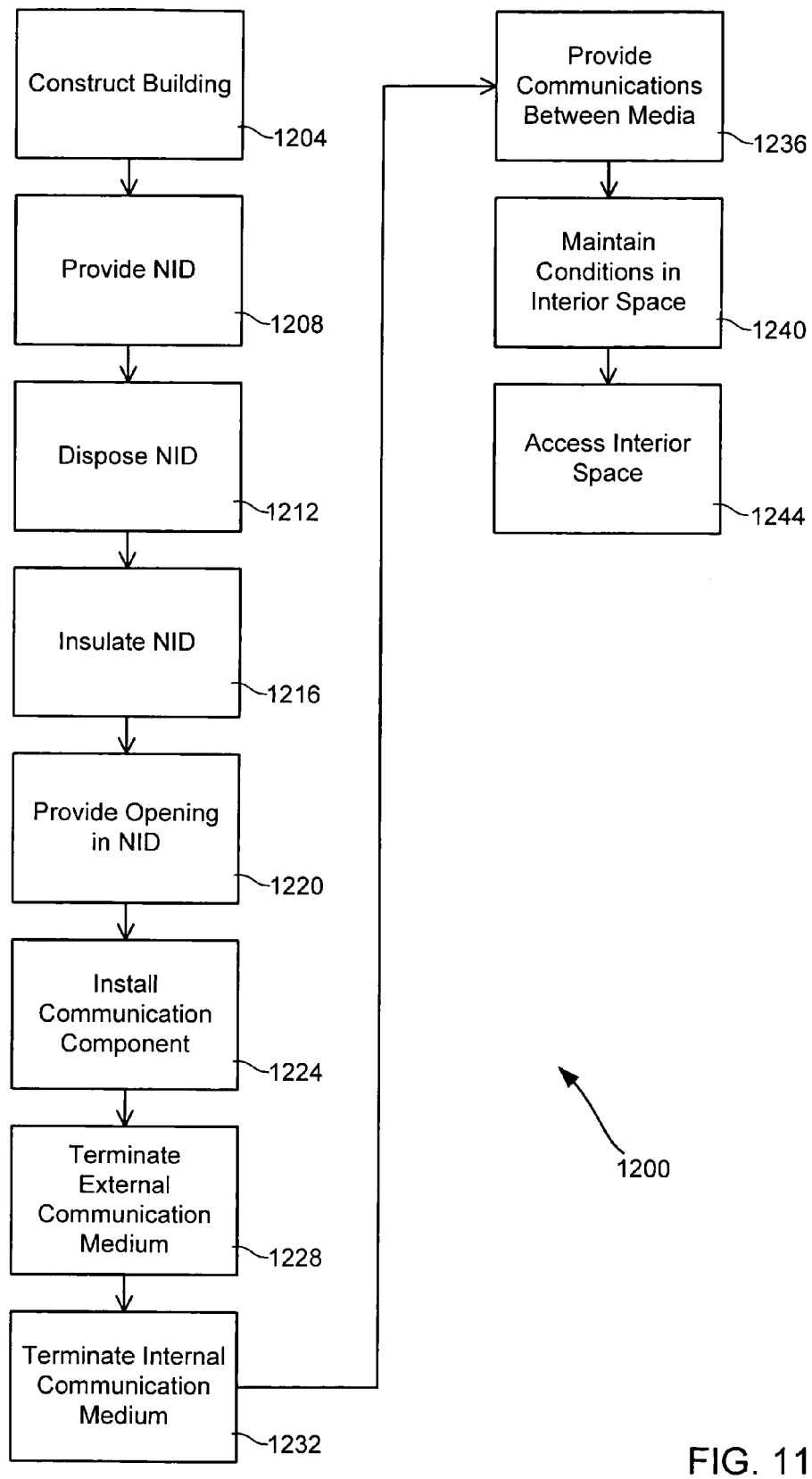
FIG. 11 illustrates a method of implementing a network interface device, in accordance with various embodiments of the invention.

Other embodiments of the invention provide methods for installing, implementing and/or using a NID (including without limitation those NIDs described above) and/or for providing subscriber premises incorporating such NIDs. FIG. 11 illustrates a method 1200 exemplary of some such embodiments. The method can comprise constructing a building (block 1204), which may be a subscriber premises and/or which can have at least one external wall. In some cases, the external wall may incorporate at least two structural members, as described in detail above.

The method may further comprise providing a NID (block 1208), which can be, inter alia, any of the NIDs discussed herein. In some cases, providing a NID can comprises disposing a NID within a wall (perhaps an external wall) of a subscriber premises (block 1212), such that one face of the NID can be exposed to the internal environment of the subscriber premises, while another face of the NID may be exposed to the exterior of the subscriber premises. In other cases, providing a NID can include disposing the NID between a plurality of structural members of the wall and/or providing devices for attaching the NID to one or more structural members. In further cases, providing a NID can comprise securing the NID to a wall (and/or a structural member thereof) to prevent easy removal of the NID by an unauthorized person.

The method can further comprise insulating the NID (block 1216); insulating the NID can include adding insulation to a lid and/or another portion of a NID, as described above, which can improve the thermal resistance of the NID. In some cases, as detailed above, a portion of the NID exposed to relatively extreme external temperatures may be insulated, while another portion of the NID exposed to relatively constant temperatures (such as the prevailing temperatures of the interior of a subscriber premises) may be left uninsulated. In some cases, an opening may be provided in the NID (block 1220). The opening can function to allow airflow between the interior of the subscriber premises and the interior (or a portion thereof) of the NID itself.

In some cases, as described in detail above, an "empty" NID may be disposed at a customer premises, e.g., by a builder during the construction of a subscriber premises. In such cases (as well as others), the method 1200 may include disposing within the NID one or more telecommunication components. In particular cases, the NID may comprise one or more attachment members, and/or the telecommunication components may be coupled to such attachment members. In accordance with some embodiments, this may be done after the process of constructing the subscriber premises and/or disposing the NID has been completed.

In accordance with certain embodiments, the method 1200 can further comprise terminating an external communication medium at and/or within the NID (block 1228) and/or terminating an internal communication medium at and/or within the NID (block 1232). Terminating the external communication medium and/or the internal communication medium can comprise coupling the communication medium with a multiplexer, hub, switch, demarcation device, filter, and/or any other suitable communication component. In particular cases, the respective media may be terminated by coupling each to the other. Hence, the method may include providing communications between an internal communication medium and an external communication medium (block 1236), e.g., in any of the ways discussed herein, including without limitation coupling the media via demarcation device, coupling the media each to the other, etc. In some cases, a plurality of external and/or internal communication media may be coupled, as described in detail above and in the applications already incorporated by reference.

The method can also comprise maintaining the environmental conditions in the interior space of the NID (block 1240). In some cases, disposing the NID within a wall of the customer premises, insulating at least a portion of the lid and/or providing openings to allow airflow between the NID and the interior of the subscriber premises can suffice to maintain the environmental conditions in the interior space of the NID. In other cases, a circulation device and/or other active means of maintaining the environmental conditions may be used, as described above. In still other cases, the NID may be configured to encourage thermal exchange (e.g., via conduction, convection and/or radiation) with the interior of a customer premises, as described in detail above. Finally, the method can comprise accessing the interior space of the NID (block 1244), e.g. to configure, add, modify, etc. a communication component housed by the NID. Accessing the interior space of the NID can include accessing the interior space via the lid, via an access panel (as described above), etc.

In conclusion, the present invention provides novel network interface devices, and systems and methods for their installation, use and/or implementation. While detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. In a relationship between a telecommunication service provider and a subscriber, a network interface device configured to be disposed at a subscriber premises, the network interface device comprising:

a first face configured to be at least partially exposed to an exterior of a subscriber premises, the first face comprising a security device configured to prevent unauthorized access to the network interface device from the exterior of the subscriber premises;

a second face generally opposing the first face and configured to be at least partially exposed to an interior of a subscriber premises, wherein the first and second faces define an interior space of the network interface device, the interior space being configured to have disposed therein at least one telecommunication component and to have generally stable environmental conditions, the first face being further configured to protect the interior space from ambient environmental conditions external to the subscriber premises, and the second face being further configured to allow ambient environmental conditions internal to the subscriber premises to influence the interior space;

at least one telecommunication component disposed within the space defined by the first and second faces, the at least one telecommunication component being configured to provide connectivity between an internal communication medium and an external communication medium; and a backup supply of electrical power disposed within the interior space defined by the first and second faces and in electrical communication with the at least one telecommunication component, the backup supply of electrical power being configured to provide operational power to the at least one telecommunication component in the event of a general electrical power failure affecting the subscriber premises, the backup supply of electrical power comprising a plurality of batteries, the plurality of batteries comprising:

a first battery that may be accessed only via the first face of the network interface device, and;

a second battery that may be accessed only via the second face of the network interface device.

2. A network interface device as recited in claim 1, wherein the backup supply of electrical power may be accessed via the first face of the network interface device.

3. A network interface device as recited in claim 1, wherein the backup supply of electrical power may be accessed via the second face of the network interface device.

4. In a relationship between a telecommunication service provider and a subscriber, a network interface device configured to be disposed at a subscriber premises, the network interface device comprising:

a first face configured to be at least partially exposed to an exterior of a subscriber premises, the first face comprising a security device configured to prevent unauthorized access to the network interface device from the exterior of the subscriber premises, a second face generally opposing the first face and configured to be at least partially exposed to an interior of a subscriber premises, wherein the first and second faces define an interior space of the network interface device, the interior space being configured to have generally stable environmental conditions, the first face being further configured to protect the interior space from ambient environmental conditions external to the subscriber premises, and the second face being further configured to allow ambient environmental conditions internal to the subscriber premises to influence the interior space;

at least one attachment member disposed within the interior space defined by the first and second faces, the at least one attachment member being configured to be coupled with at least one telecommunication component; and a backup supply of electrical power disposed within the interior space defined by the first and second faces and in electrical communication with the at least one telecommunication component, the backup supply of electrical power being configured to provide operational power to the at least one telecommunication component in the event of a general electrical power failure affecting the subscriber premises, the backup supply of electrical power comprising a plurality of batteries, the plurality of batteries comprising:

a first battery that may be accessed only via the first face of the network interface device, and;

a second battery that may be accessed only via the second face of the network interface device.

5. In a relationship between a telecommunication service provider and a subscriber, a network interface device designed to be located at a subscriber premises, the network interface device being configured to provide a stable operating environment for telecommunication components, the network interface device comprising a first face and a second face generally opposing the first face, the first and second faces defining an interior space therebetween sufficient to house at least one telecommunication component, wherein the first face is configured to be at least partially exposed to an exterior of a subscriber premises, such that at least a portion of the first face may be accessed by a technician of the telecommunication service provider at a location exterior to the subscriber premises without requiring access to an interior of the subscriber premises, and wherein the second face is configured to be at least partially exposed to the interior of the subscriber premises, such that the exposure of at least a portion of the second face to the interior of the subscriber premises allows ambient environmental conditions of the interior of the subscriber premises to affect the environmental conditions of the space defined by the first face and the second face, the network interface device further defining at least one opening through which at least one external communication medium and at least one external communication medium may be disposed, allowing the at least one internal communication medium and the at least one external communication medium to be terminated within the network interface device, the network interface device further comprising a backup supply of electrical power disposed within the interior space defined by the first and second faces and in electrical communication with at least one telecommunication component, the backup supply of electrical power being configured to provide operational power to the at least one telecommunication component in the event of a general electrical power failure affecting the subscriber premises, the backup supply of electrical power comprising a plurality of batteries, the plurality of batteries comprising a first battery that may be accessed only via the first face of the network interface device, and a second battery that may be accessed only via the second face of the network interface device.

6. A network interface device as recited in claim 5, wherein the second face defines at least one opening configured to allow the exchange of airflow between the interior of the subscriber premises and the interior space defined by the first and second faces.

7. A network interface device as recited in claim 6, further comprising a circulation device configured to facilitate the exchange of airflow between the interior of the subscriber premises and the interior space defined by the first and second faces.

8. A network interface device as recited in claim 5, wherein the second face is configured to encourage thermal transfer between the interior of the subscriber premises and the interior space defined by the first and second faces.

9. A network interface device as recited in claim 8, wherein the second face comprises a relatively thermally-conductive material.

10. A network interface device as recited in claim 8, wherein the second face comprises a plurality of baffles configured to provide a relatively large surface area across which thermal transfer may occur.

11. A network interface device as recited in claim 5, wherein the first face comprises an insulating material configured to inhibit thermal conductivity between environmental conditions outside the subscriber premises and the interior space defined by the first and second faces.

12. A network interface device as recited in claim 5, wherein the network interface device is configured to be disposed at least partially within an external wall of the subscriber premises.

13. A network interface device as recited in claim 5, wherein the network interface device is configured to be disposed between two structural members of an external wall of the subscriber premises.

14. A network interface device as recited in claim 5, wherein the second face of the network interface device is configured to be sufficiently small that, if the network interface device were displaced, a human would not be able to access the interior of the subscriber premises through an opening created by the displacement of the network interface device.

15. A network interface device as recited in claim 5, wherein the second face of the network interface device is configured to provide access from the interior of the subscriber premises to at least a portion of the interior space defined by the first and second faces.

16. A network interface device as recited in claim 15, wherein the network interface device is further configured to secure the second face to prevent access to the interior of the subscriber premises from the interior space defined by the first and second faces.

17. A network interface device as recited in claim 16, wherein at least a portion of the second face is configured as an access panel that can be opened to provide access from the interior of the subscriber premises to at least a portion of the interior space defined by the first and second faces, and wherein the network interface device further comprises means to prevent the access panel from being opened except from the interior of the subscriber premises.

18. A network interface device as recited in claim 15, further comprising a dividing member disposed to divide the interior space defined by the first and second faces into a first interior space and a second interior space.

19. A network interface device as recited in claim 5, wherein the first face of the network interface device is configured to provide access to at least a portion of the interior space defined by the first and second faces from the location exterior to the subscriber premises.

20. A network interface device as recited in claim 5, further comprising a dividing member configured to divide the space defined by the first and second faces of the network interface device into a first space and a second space, wherein at least one of the first and second spaces has ambient environmental conditions substantially similar to the ambient environmental conditions of the interior of the subscriber premises.

21. A network interface device as recited in claim 5, further comprising at least one telecommunication component disposed within the interior space and configured to provide communication between the at least one external telecommunication medium and the at least one internal telecommunication medium.

22. In a relationship between a telecommunication service provider and a subscriber, a method of providing telecommunication services to the subscriber, the method comprising:

providing, at the subscriber premises, a network interface device, the network interface device comprising:
a first face configured to be at least partially exposed to an exterior of a subscriber premises,
a second face generally opposing the first face and configured to be at least partially exposed to an interior of a subscriber premises, wherein the first and second faces define an interior space of the network interface device, the interior space being configured to have generally stable environmental conditions, the first face being further configured to protect the interior space from ambient environmental conditions external to the subscriber premises, and the second face being further configured to allow ambient environmental conditions internal to the subscriber premises to influence the interior space;
at least one telecommunication component disposed within the space defined by the first and second faces, the at least one telecommunication component being configured to provide connectivity between an internal communication medium and an external communication medium; and
a backup supply of electrical power disposed within the interior space defined by the first and second faces and in electrical communication with the at least one telecommunication component, the backup supply of electrical power being configured to provide operational power to the at least one telecommunication component in the event of a general electrical power failure affecting the subscriber premises, the backup supply of electrical power comprising a plurality of batteries, the plurality of batteries comprising:
a first battery that may be accessed only via the first face of the network interface device, and;
a second battery that may be accessed only via the second face of the network interface device; and
disposing the network interface device so that the first face of the network interface device is at least partially exposed to an exterior of the subscriber premises and the second face of the network interface device is at least partially exposed to an interior of the subscriber premises.

23. A method as recited in claim 22, wherein the first face comprises a security device configured to prevent unauthorized access to the network interface device from the exterior of the subscriber premises.

24. A method as recited in claim 22, wherein the second face comprises a security device configured to prevent unauthorized access to the interior of the subscriber premises from the interior space of the network interface device.

25. A method as recited in claim 22, wherein disposing the network interface device so that the first face of the network interface device is at least partially exposed to an exterior of the subscriber premises and the second face of the network interface device is at least partially exposed to an interior of the subscriber premises comprises disposing the network interface at least partially within an external wall of the subscriber premises.

26. A method as recited in claim 22, wherein disposing the network interface device so that the first face is at least partially exposed to an exterior of the subscriber premises and the second face is at least partially exposed to an interior of the subscriber premises comprises disposing the network interface between two structural members of an exterior wall of the subscriber premises.

27. A method as recited in claim 22, further comprising:
terminating an external communication medium within the interior space defined by the first and second faces;

terminating an internal communication medium within the interior space defined by the first and second faces; and
providing with the at least one telecommunication component communications between the external communication medium and the internal communication medium.

28. A method as recited in claim 22, further comprising maintaining the interior space of the network interface device at relatively constant environmental conditions.

29. A method as recited in claim 22, further comprising accessing the interior space of the network interface device from a location external to the subscriber premises via the first face of the network interface device.

30. A method as recited in claim 22, further comprising accessing the interior space of the network interface device from the interior of the subscriber premises via the second face of the network interface device.

31. A method as recited in claim 22, further comprising securing the second face of the network interface device such that the interior space of the network interface device may be accessed from the interior of the subscriber premises via the second face of the network interface device but the second face of the network interface device may not be opened from the interior of the network interface device, preventing unauthorized access to the interior of the subscriber premises from the interior of the network interface device.

32. A method as recited in claim 22, further comprising insulating the first face of the network interface device to inhibit thermal transfer from the exterior of the subscriber premises to the interior space defined by the first and second faces of the network interface device.

33. A method as recited in claim 22, further comprising providing at least one opening in the second face of the network interface device, the at least one opening being configured to allow the exchange of airflow between the interior of the subscriber premises and the interior space defined by the first and second faces.

34. A method as recited in claim 22 wherein the second face is configured to encourage thermal transfer between the interior of the subscriber premises and the interior space defined by the first and second faces.

35. A method as recited in claim 34, wherein the second face comprises a relatively thermally-conductive material.

36. A method as recited in claim 34, wherein the second face comprises a plurality of baffles configured to provide a relatively large surface area across which thermal transfer may occur.

37. A method as recited in claim 22, wherein the network interface device further comprises a circulation device configured to facilitate the exchange of airflow between the interior of the subscriber premises and the interior space defined by the first and second faces, the method further comprising operating the circulation device.

38. In a relationship between a telecommunication service provider and a subscriber, a method of providing telecommunication services to the subscriber, the method comprising:
providing, at the subscriber premises, a network interface device, the network interface device comprising:
a first face configured to be at least partially exposed to an exterior of a subscriber premises, the first face comprising a security device configured to prevent unauthorized access to the network interface device from the exterior of the subscriber premises,
a second face generally opposing the first face and configured to be at least partially exposed to an interior of a subscriber premises, wherein the first and second faces define an interior space of the network interface device, the interior space being configured to have generally stable environmental conditions, the first face being further configured to protect the interior space from ambient environmental conditions external to the subscriber premises, and the second face being further configured to allow ambient environmental conditions internal to the subscriber premises to influence the interior space;
at least one attachment member disposed within the interior space defined by the first and second faces, the at least one attachment member being configured to be coupled with at least one telecommunication component;
a backup supply of electrical power disposed within the interior space defined by the first and second faces and in electrical communication with the at least one telecommunication component, the backup supply of electrical power being configured to provide operational power to the at least one telecommunication component in the event of a general electrical power failure affecting the subscriber premises, the backup supply of electrical power comprising a plurality of batteries, the plurality of batteries comprising:
a first battery that may be accessed only via the first face of the network interface device, and;
a second battery that may be accessed only via the second face of the network interface device;
disposing the network interface device so that the first face of the network interface device is at least partially exposed to an exterior of the subscriber premises and the second face of the network interface device is at least partially exposed to an interior of the subscriber premises.

39. A method as recited in claim 38, further comprising:
coupling a telecommunication component with the at least one attachment member, so that the telecommunication component is disposed within the interior space defined by the first and second faces.

40. A method as recited in claim 39, further comprising:
terminating an external communication medium within the interior space defined by the first and second faces;
terminating an internal communication medium within the interior space defined by the first and second faces; and
providing with the at least one telecommunication component communications between the external communication medium and the internal communication medium.

41. In a relationship between a telecommunication service provider and a subscriber, a method of providing telecommunication services to the subscriber, the method comprising:
providing a network interface device designed to be located at a subscriber premises, the network interface device being configured to provide a stable operating environment for telecommunication components, the network interface device comprising a first face and a second face generally opposing the first face, the first and second faces defining an interior space therebetween sufficient to house at least one telecommunication component, wherein the first face is configured to be at least partially exposed to an exterior of a subscriber premises, such that at least a portion of the first face may be accessed by a technician of the telecommunication service provider at a location exterior to the subscriber premises without requiring access to an interior of the subscriber premises, and wherein the second face is configured to be at least partially exposed to the interior of the subscriber premises, such that the exposure of at least a portion of the second face to the interior of the subscriber premises allows ambient environmental conditions of the interior of the subscriber premises to affect the environmental conditions of the space defined by the first face and the second face, the network interface device further defining at least one opening through which at least one external communication medium and at least one external communication medium may be disposed, allowing the at least one internal communication medium and the at least one external communication medium to be terminated within the network interface device, the network interface device further comprising a backup supply of electrical power disposed within the interior space defined by the first and second faces and in electrical communication with at least one telecommunication component, the backup supply of electrical power being configured to provide operational power to the at least one telecommunication component in the event of a general electrical power failure affecting the subscriber premises, the backup supply of electrical power comprising a plurality of batteries, the plurality of batteries comprising a first battery that may be accessed only via the first face of the network interface device, and a second battery that may be accessed only via the second face of the network interface device; and disposing the network interface device so that the first face of the network interface device is at least partially exposed to an exterior of the subscriber premises and the second face of the network interface device is at least partially exposed to an interior of the subscriber premises.

42. In a relationship between a telecommunication service provider and a subscriber, a system for providing telecommunication services to the subscriber, the system comprising:

an external communication medium in communication with a telecommunication network;

a network interface device in communication with the external communication medium and configured to provide communication between the external communication network and an internal communication local to a premises of the subscriber, the network interface device comprising:

a first face configured to be at least partially exposed to an exterior of a subscriber premises, a second face generally opposing the first face and configured to be at least partially exposed to an interior of a subscriber premises, wherein the first and second faces define an interior space of the network interface device, the interior space being configured to have generally stable environmental conditions, the first face being further configured to protect the interior space from ambient environmental conditions external to the subscriber premises, and the second face being further configured to allow ambient environmental conditions internal to the subscriber premises to influence the interior space; and a backup supply of electrical power disposed within the interior space defined by the first and second faces and in electrical communication with at least one telecommunication component, the backup supply of electrical power being configured to provide operational power to the at least one telecommunication component in the event of a general electrical power failure affecting the subscriber premises, the backup supply of electrical power comprising a plurality of batteries, the plurality of batteries comprising:

a first battery that may be accessed only via the first face of the network interface device, and;

a second battery that may be accessed only via the second face of the network interface device.

43. A system for providing telecommunication services as recited in claim 42, wherein the first face comprises a security device configured to prevent unauthorized access to the network interface device from the exterior of the subscriber premises.

44. A system for providing telecommunication services as recited in claim 42, wherein the second face comprises a security device configured to prevent unauthorized access to the interior of the subscriber premises from the interior space of the network interface device.

45. A system for providing telecommunication services as recited in claim 42, wherein the network interface device farther comprises a backup supply of electrical power disposed within the interior space defined by the first and second faces and in electrical communication with the at least one telecommunication component, the backup supply of electrical power being configured to provide operational power to the at least one telecommunication component in the event of a general electrical power failure affecting the subscriber premises.

46. A subscriber premises comprising:

at least one external wall; and a network interface device at least partially disposed within the at least one external wall, the network interface device comprising:

a first face configured to be at least partially exposed to an exterior of a subscriber premises, a second face generally opposing the first face and configured to be at least partially exposed to an interior of the subscriber premises, wherein the first and second faces define an interior space of the network interface device, the interior space being configured to have generally stable environmental conditions, the first face being further configured to protect the interior space from ambient environmental conditions external to the subscriber premises, and the second face being further configured to allow ambient environmental conditions internal to the subscriber premises to influence the interior space; and a backup supply of electrical power disposed within the interior space defined by the first and second faces and in electrical communication with at least one telecommunication component, the backup supply of electrical power being configured to provide operational power to the at least one telecommunication component in the event of a general electrical power failure affecting the subscriber premises, the backup supply of electrical power comprising a plurality of batteries, the plurality of batteries comprising:

a first battery that may be accessed only via the first face of the network interface device, and;

a second battery that may be accessed only via the second face of the network interface device.

47. A subscriber premises as recited in claim 46, wherein:

the at least one external wall comprises a first structural member and a second structural member; and the network interface device is disposed between the first structural member and the second structural member.

48. A method of providing a subscriber premises, the method comprising:

constructing a subscriber premises comprising at least one external wall; and disposing at least partially within the at least one external wall a network interface device comprising:

a first face configured to be at least partially exposed to an exterior of a subscriber premises, a second face generally opposing the first face and configured to be at least partially exposed to an interior of the subscriber premises, wherein the first and second faces define an interior space of the network interface device, the interior space being configured to have generally stable environmental conditions, the first face being further configured to protect the interior space from ambient environmental conditions external to the subscriber premises, and the second face being further configured to allow ambient environmental conditions internal to the subscriber premises to influence the interior space; and a backup supply of electrical power disposed within the interior space defined by the first and second faces and in electrical communication with at least one telecommunication component, the backup supply of electrical power being configured to provide operational power to the at least one telecommunication component in the event of a general electrical power failure affecting the subscriber premises, the backup supply of electrical power comprising a plurality of batteries, the plurality of batteries comprising:

a first battery that may be accessed only via the first face of the network interface device, and;

a second battery that may be accessed only via the second face of the network interface device.

49. A method of providing a subscriber premises as recited in claim 48, wherein:

constructing a subscriber premises comprising at least one external wall comprises incorporating within the at least one external wall a first structural member and a second structural member; and disposing at least partially within the at least one external wall a network interface device comprises disposing the network interface device between the first structural member and the second structural member.

50. A method of providing a subscriber premises as recited in claim 48, wherein:

the network interface device further comprises at least one attachment member disposed within the interior space defined by the first and second faces, the at least one attachment member being configured to be coupled with at least one telecommunication component; and the method further comprises coupling at least one telecommunication component with the at least one attachment member.

51. A method of providing a subscriber premises as recited in claim 50, wherein the step of coupling at least one telecommunication component with the at least one attachment member is performed substantially after the steps of constructing a subscriber premises and disposing the network interface device.

52. In a relationship between a telecommunication service provider and a subscriber, a network interface device configured to be disposed at a subscriber premises, the network interface device comprising:

a first face configured to be at least partially exposed to an exterior of a subscriber premises;

a second face generally opposing the first face and configured to be at least partially exposed to an interior of a subscriber premises;

at least one telecommunication component disposed within the space defined by the first and second faces; and a backup supply of electrical power disposed within the interior space defined by the first and second faces and in electrical communication with the at least one telecommunication component, the backup supply of electrical power being configured to provide operational power to the at least one telecommunication component in the event of a general electrical power failure affecting the subscriber premises, wherein:

a first portion of the backup supply may be accessed only via the first face of the network interface device, and;

a second portion of the backup supply may be accessed only via the second face of the network interface device.

* * * * *